United States Patent [19]

Eshera et al.

[11] Patent Number: 5,613,014
[45] Date of Patent: Mar. 18, 1997

[54] FINGERPRINT MATCHING SYSTEM

[75] Inventors: Mohamed A. Eshera; Russell E. Sanders, both of Columbia, Md.

[73] Assignee: Martin Marietta Corp., Bethesda, Md.

[21] Appl. No.: 322,048

[22] Filed: Oct. 12, 1994

[51] Int. Cl.$^6$ ........................................ G06K 9/00
[52] U.S. Cl. .............................. 382/124; 382/125; 356/71
[58] Field of Search ........................................ 382/124, 125; 356/71

[56] References Cited

U.S. PATENT DOCUMENTS

| | | | |
|---|---|---|---|
| 3,611,290 | 10/1971 | Luisi et al. | 382/125 |
| 4,135,147 | 1/1979 | Riganati et al. | 382/125 |
| 4,310,827 | 1/1982 | Asai | 382/125 |
| 4,817,183 | 3/1989 | Sparrow | 382/125 |
| 4,936,680 | 6/1990 | Henkes et al. | 356/71 |
| 4,944,021 | 7/1990 | Hoshino et al. | 382/125 |
| 4,947,442 | 8/1990 | Tanaka et al. | 382/125 |

FOREIGN PATENT DOCUMENTS 0050842  5/1982  European Pat. Off. .

OTHER PUBLICATIONS

"Exclusive Use Equipment", pp. 143–159, NEC Research & Development, No. 96, Mar. 1990, Tokyo, JP.
"A Method of describing Fingerprint Structure and Identification Algorithm Using Geometric Characteristics", Systems & Computers in Japan, May 1994, pp. 100–112, vol. 25, No. 5, ISSN 0882–1666.
"An Image Understanding System Using Attributed Symbolic Representation and Inexact Graph–Matching", IEEE Transactions on Pattern Analysis and Machine Intelligence, Sep. 1986, USA, vol. PAMI–8, No. 5, ISSN 0162–8828, pp. 604–617.
"Automatic Fingerprint Identification Systems" Raymond Moore pp. 163–191, 1991.
NEC Brochure, No. 96, No author identified Mar. 1990 pp. 143–159.

*Primary Examiner*—Leo Boudreau
*Assistant Examiner*—Chris Kelley
*Attorney, Agent, or Firm*—W. H. Meise; R. S. Hulse; G. Chin

[57] ABSTRACT

An image comparison arrangement uses an electronic computer to compare digitized fingerprint minutia maps of fingerprints of an unknown fingerprint set with corresponding maps of reference fingerprint sets which are stored in memory, in order to identify unknown fingerprints or to match fingerprints. The matching is performed by converting all the fingerprints to attributed relation graphs (ARGs) including nodes and branches, to which attributes are appended. For each fingerprint pair being compared, a distance matrix is generated, the elements of which are the similarities of stars. The highest-ranking star pair is selected as the starting point of a comparison tree, by which attempts are made to fill a match core with elements representing the matching stars. The comparison is of the various attributes of the nodes and branches of each star. Once the maximum consistent number of stars has been matched in each fingerprint set, the next reference fingerprint is compared with the unknown fingerprint, until all relevant reference fingerprints have been compared. The number of elements in the match core indicates the degree of match of the unknown to each reference fingerprint.

4 Claims, 13 Drawing Sheets

| x,y LOCATION | DIRECTION | LOCAL RIDGE WIDTH | MINUTIA TYPE |
|---|---|---|---|
| 18 bits | 8 bits | 8 bits | 1 to 2 bits |

| NODE IDs | RIDGE COUNT | FUZZY QUAD ASSIGNMENT | RIDGE ASSIGNMENT | EUCLIDEAN DISTANCE | NORMALIZED RIDGE WIDTH DISTANCE |
|---|---|---|---|---|---|
| 16 bits | 4 bits | 8 bits | 2 bits | 32 bits | 32 bits |

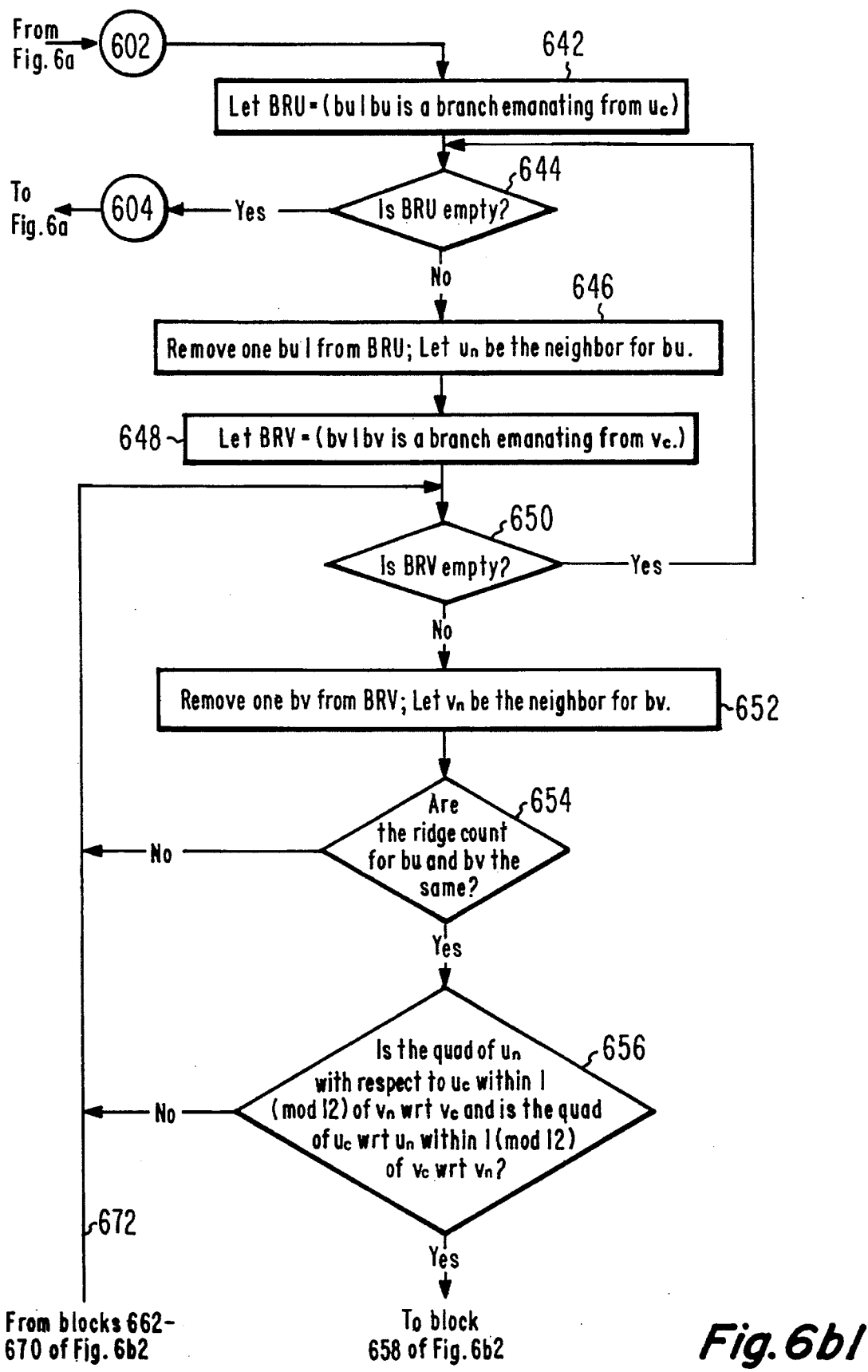
Fig. 6b1

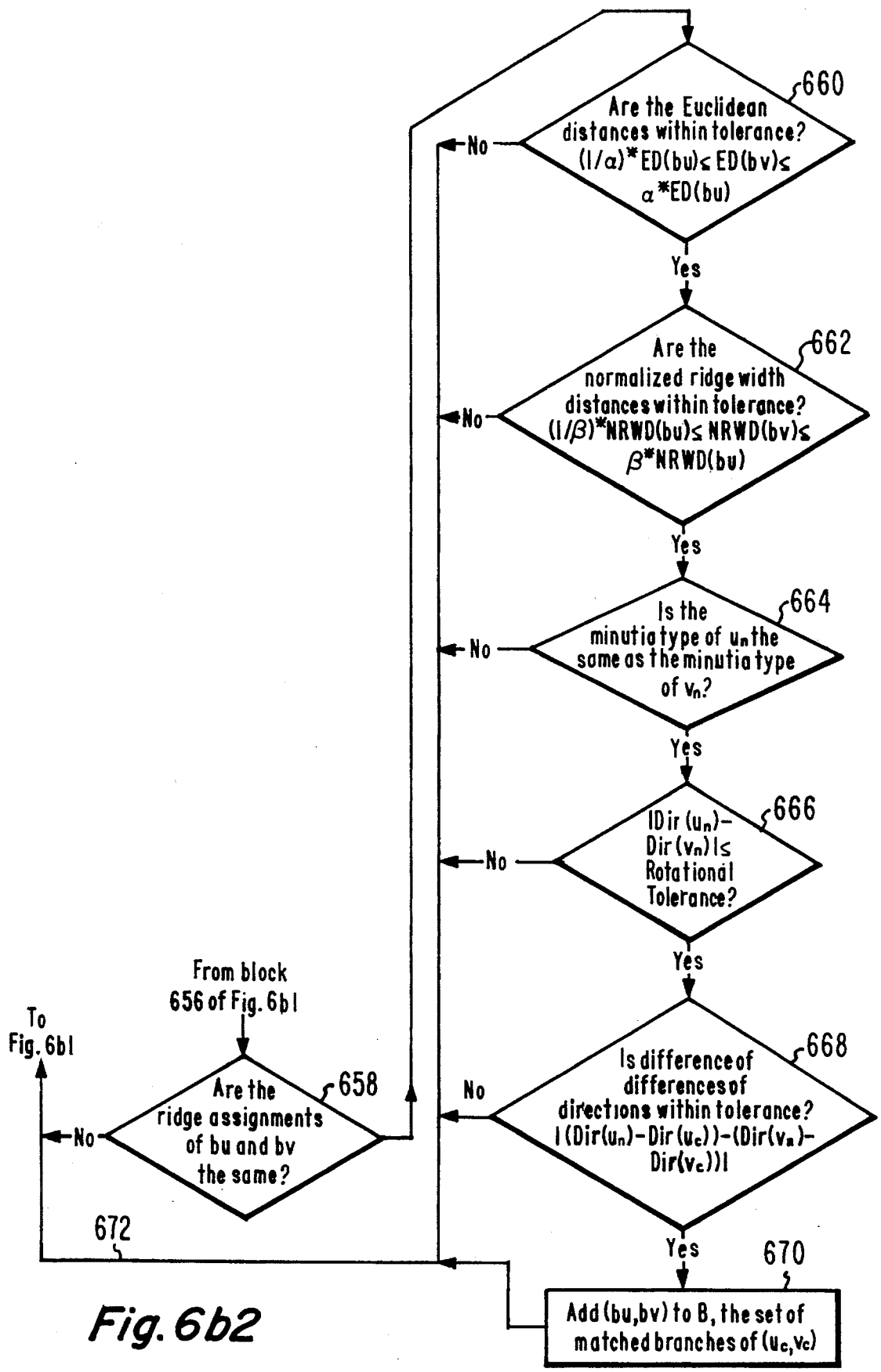
Fig. 6b2

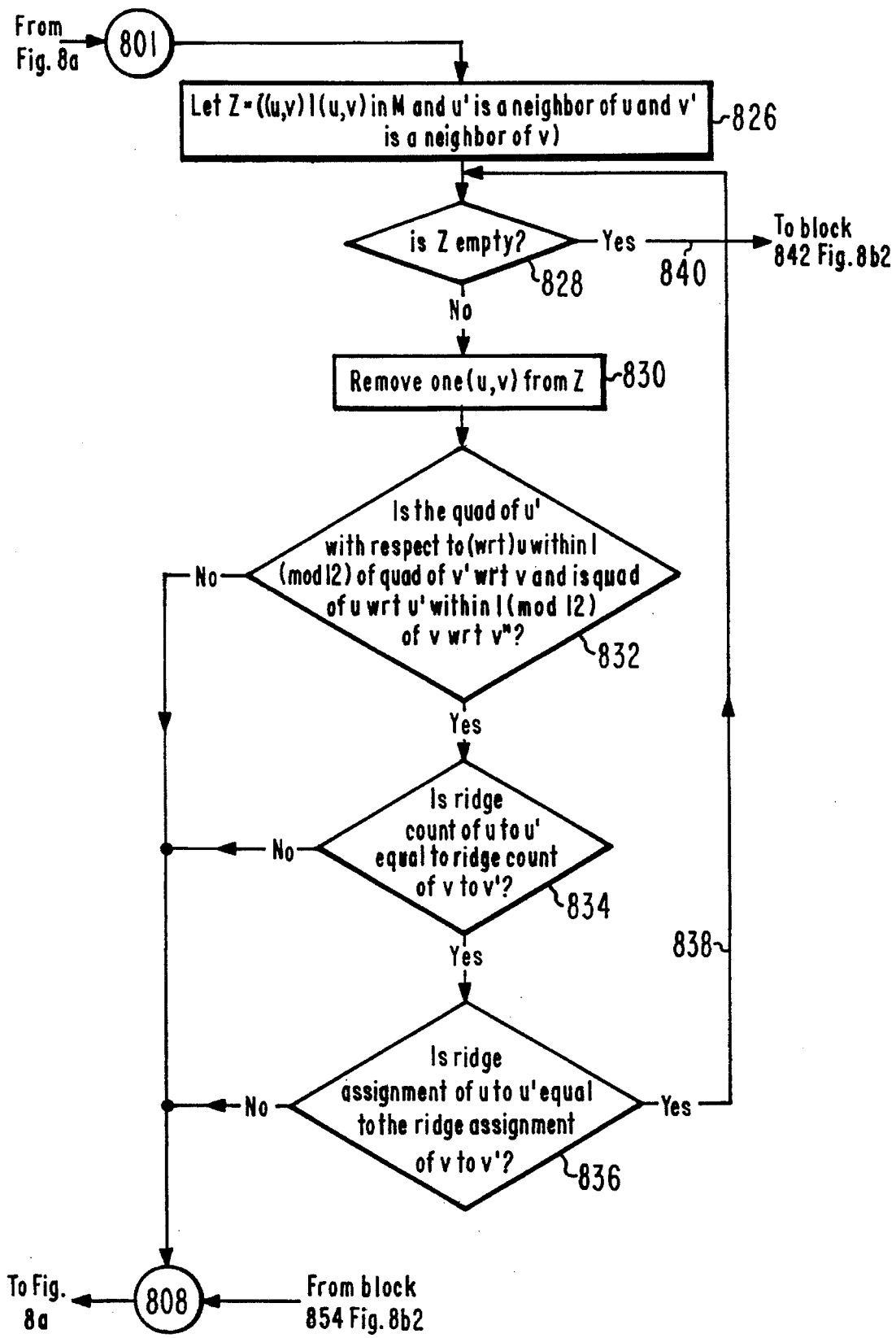
Fig. 8b1

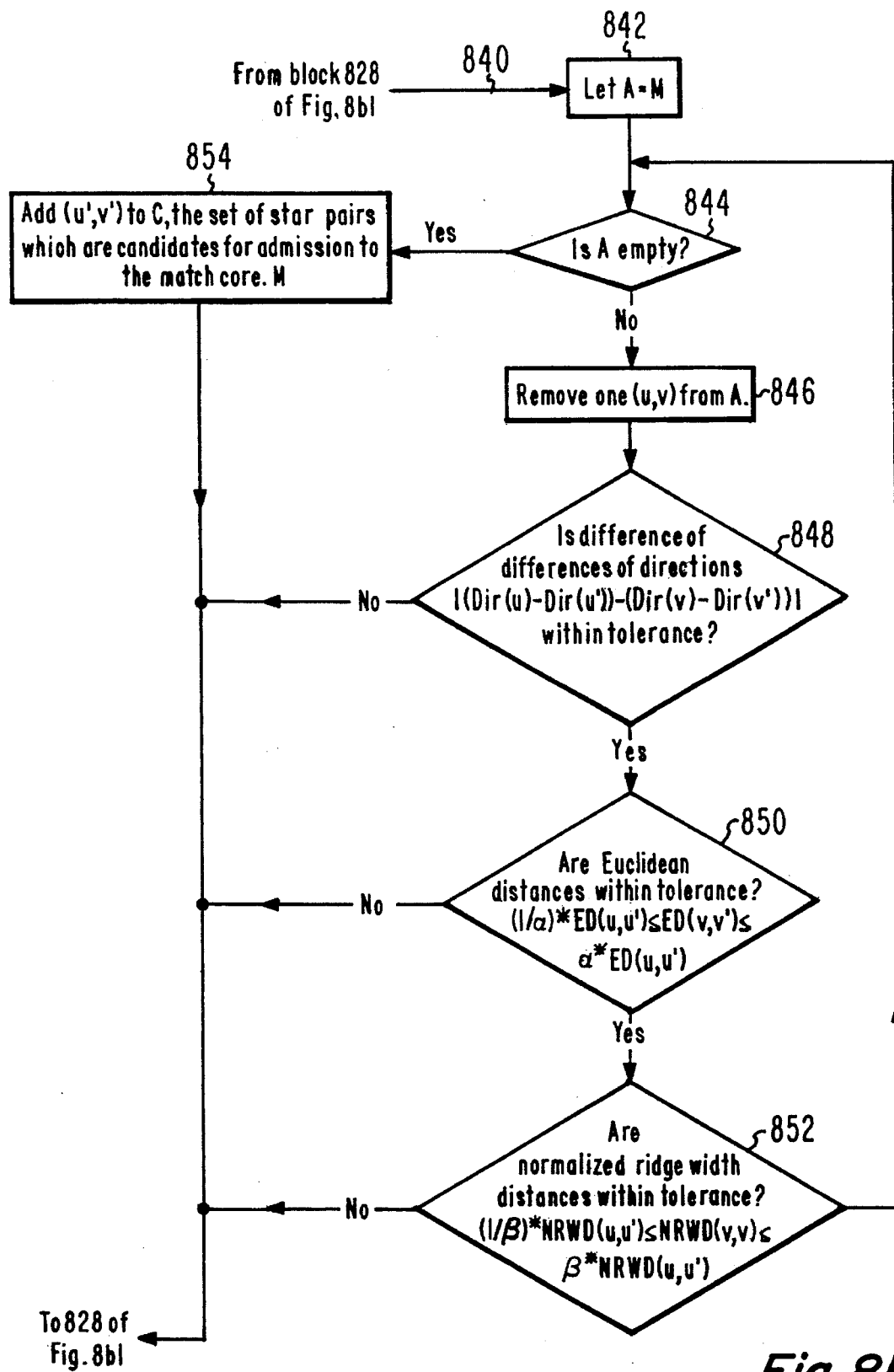
Fig. 8b2

FINGERPRINT MATCHING SYSTEM

FIELD OF THE INVENTION

This invention relates to identification of fingerprints, and possibly to other personal characteristic matching, and more particularly to the matching of a set of fingerprints with a reference file containing many fingerprints, and verification of whether two or more fingerprint impressions are from the same finger or from different fingers.

BACKGROUND OF THE INVENTION

Pattern matching or comparison schemes have many applications, such as identifying machine parts in a manufacturing context, and the reading of addresses in a mail-sorting context. The above-mentioned applications are among the simpler uses of such comparisons, because, in the case of machine parts, the number of different parts is finite, and their shapes are, in general, relatively simple; the text reading context has only 26 letters and ten digits to identify, although the number of permutations of machine printing is large.

More complex types of comparisons are those involving differentiation among items which are similar, but not identical, especially when the conditions under which the images are formed is not uniform. When the images are of biological specimens, the variability of the images may be very large. One such aspect of image matching is that of matching the retinal patterns of subjects for identification. Another use is that of identification of fingerprints by comparison with file fingerprints.

Fingerprints are very rich in information content. There are two major types of information in a fingerprint. First is the ridge flow information, and second is the specific features or minutiae (minutia) of the fingerprint. As used herein, the term "minutia" is used to denote both the singular and plural. Fingerprints uniquely identify an individual based on their information content. Information is represented in a fingerprint by the minutia and their relative topological relationships. The number of minutia in a fingerprint varies from one finger to another, but, on average, there are about eighty (80) to one hundred and fifty (150) minutia per fingerprint. In the fingerprint context, a large store of fingerprints exists in law enforcement offices around the country. These fingerprints include files of fingerprints of known individuals, made in conjunction with their apprehension or for some other reason such as security clearance investigation or of obtaining immigration papers, often by rolling the inked fingers on cards, and also includes copies of latent fingerprints extracted from crime scenes by various methods. These reference fingerprints are subject to imperfections such as overinking, which tends to fill in valleys in fingerprints, and underinking, which tends to create false ridge endings, and possibly both overinking and underinking in different regions of the same fingerprint image. Smudging and smears occur at different places in the fingerprint due to unwanted movement of the finger, or uneven pressure placed on the finger, during the rolling process. The stored fingerprints are also subject to deterioration while in storage, which may occur, for instance, due to fading of the older images, or due to stains. Furthermore, the wide variation in the level of experience among fingerprint operators, and the conditions under which the fingerprint is obtained, produces wide variation in quality in the fingerprint images. Similar effects occur due to the variation of the scanning devices in cases of live scanning of fingerprints.

Matching of fingerprints in most existing systems relies for the most part on comparison of cores and deltas as global registration points, which tends to make the comparisons susceptible to errors due to the many sources of distortion and variations listed above, which almost always occur due to the various different inking, storage and preprocessing conditions which may be encountered.

As described at pages 164–191 of the text *Advances in Fingerprint Technology*, by Henry C. Lee and R. E. Guenssten, published by Elsevier in 1991, efforts have been underway for a long time to automate fingerprint identification, because manual search is no longer feasible due to the large number of reference files. The effort to automate fingerprint identification involves two distinct areas, namely (a) that of fingerprint scanning and minutia identification, and (b) comparison of lists of minutia relating to different fingerprints in order to identify those which match. Large files of reference fingerprints have been scanned, and minutia lists in digital form obtained therefrom, either by wholly automated equipment, or with semiautomated equipment requiring human aid. While not all problems in scanning of fingerprints and detection of minutia have been solved, it appears that the matching problem is the more pressing at this time.

The matching or search subsystem constitutes the most critical component of any Automated Fingerprint Identification System (AFIS). Its performance establishes the overall system matching reliability (the probability of declaring the correct mate, if one exists in the database), match selectivity (the average number of false candidates declared in each search attempt), and throughput, which is particularly important in large database systems. The unique identification of fingerprints is usually performed using the set of minutia contained in each fingerprint. For each fingerprint, these minutia form a minutia map.

FIG. 1a illustrates a particular skeletonized fingerprint impression, number F0048_04, from the National Institute of Standards and Technology (NIST) database 4, resulting from a proper inking procedure, while FIG. 1b illustrates the same skeletonized fingerprint, resulting from underinking and some smudges in the underlying impression. As a result of the different conditions under which the impressions of FIGS. 1a and 1b were made, at least some of the minutia, represented by dots in FIGS. 1a and 1b, are different, and differently located. These differences make it clear that a matching scheme must be particularly robust if it is to reliably identify an unknown or search fingerprint with a reference fingerprint without generating an excessive number of false positives.

An improved search or matching system is desired, which provides high match reliability, low match selectivity, and high system throughput in a large database context.

SUMMARY OF THE INVENTION

Images, such as fingerprints, are compared with reference fingerprints by, in the first instance, generating a file of reference fingerprints, digitizing the reference fingerprints to generate digital representations of the reference fingerprints, and storing the information in a digital memory, which may be read-only memory, magnetic tape, or the like. Such files already exist, and are maintained and updated by institutions such as the FBI.

The digitized reference fingerprint data is converted, by an electronic computing apparatus, to attributed relational graph (ARG) form, which includes (a) nodes and node attributes and (b) branches between the nodes, and branch attributes, derived from extracted digital minutia maps of the sets of reference fingerprints. The attributed relational graph includes various node and branch attributes, including topological information such as minutia location and direction. To identify a set of unidentified fingerprints (which set may contain as few as one fingerprint), that set of unidentified fingerprints must be compared with the stored set of reference fingerprints. In this context, the term "unidentified" as applied to a set of fingerprints does not necessarily mean that the fingerprints are from an unidentified person, but rather that they have not been matched against the reference fingerprint. The comparison of the set of unidentified fingerprints is made by, first, generating an attributed relational graph of each fingerprint of the unidentified fingerprint set, each of which attributed relational graphs includes (a) nodes and node attributes and (b) branches between the nodes, and branch attributes, all derived from an extracted digital minutia map of the set of unidentified fingerprints, much as was initially done for the reference fingerprint files. The generation of the attributed relational graphs implicitly generates stars centered at each of the nodes; a star includes a central node, its branches, which are the branches immediately connected to the central node, and the nodes at the ends of its branches. The second step in identification or comparison of an unidentified fingerprint set uses an electronic computing apparatus to generate a distance matrix between (a) the stars in the ARG of one of the fingerprints of the set of unknown fingerprints and (b) the stars of the ARG of one of the fingerprints in one of the sets of reference fingerprints. The distance matrix includes a matrix element associated with each pair of stars being compared. In a preferred embodiment of the invention, the elements of the distance matrix are sorted for each fingerprint pair, according to the value of the elements, to establish an order of star pair matches. A match core of consistent star pairs is generated using the distance matrix and the ARG for each fingerprint being compared. In the preferred embodiment, the generation of the match core is performed in an order established by the sorted distance matrix. The match core for each fingerprint pair being compared is expanded by adding star pairs consistent with the star pairs included within the match core, until no more such star pairs consistent with the match core are available to be added. This may occur because there is a lack of a match between the fingerprints being compared, because all available star pairs of the fingerprint pair have been matched, or because a predetermined limiting number of matched star pairs has been reached. The procedure is repeated, comparing the unidentified fingerprint successively with each fingerprint of the reference file. If the search can be reduced by extrinsic knowledge, such as the identification of the particular digit (for example, the index finger) or the hand (left or right), the search or comparison may be limited to corresponding fingerprints of the reference fingerprint file. That match core(s) which has the highest score identifies the closest pair match between the unidentified fingerprint and a fingerprint of the reference fingerprint files.

According to another aspect of the method according to the invention, the step of generating an attributed relational graph includes the steps of (a) assigning a particular node of the ARG to each minutia of the extracted digital minutia map, (b) assigning to the particular node of the ARG the location of its corresponding minutia, (c) assigning to the particular node of the ARG the direction of its corresponding minutia, (d) constructing a branch between the particular node and the nearest other node in each of four quadrants around the particular node, as established by the direction of the particular node, where the "nearest" is determined by the Euclidean distance between the nodes, and (e) assigning to the branch at least the attributes of (i) the Euclidean distance, and (ii) the quadrant within which the other node lies.

According to an aspect of the invention, the step of performing distance matrix calculations includes the steps of determining the Euclidean distance between pairs of the minutia, and dividing the Euclidean distance between the pairs of minutia by the average of the local ridge width between the minutia of the pairs, to generate normalized ridge width distances for each of the pairs, whereby the list of topological relationships includes the normalized ridge width distances.

According to a further aspect of the invention, either or both of the attributes of minutia type and local ridge width is/are assigned to the nodes of the attributed relational graph. The branches of the attributed relational graph are assigned the attributes of ridge count, normalized ridge width distance, andor "same ridge" attribute.

According to the invention, the generation of the distance matrix is performed by two steps, the first of which is comparing the values of the attributes of the stars of the ARG representations of the unknown and reference fingerprints. This includes a comparison between each branch of a star of the unknown fingerprint and each branch of a star of the reference fingerprint. A score is generated for each such pair of branches The second step in generation of an element of the distance matrix is by calculating the maximum consistent sum of scores of branch pairs for each star pair.

A match core is formed by the steps of selecting a star pair associated with, or corresponding to, a highest-value distance matrix element, which defines a first element of a match core; adding such a first element to the match core; deleting from the distance matrix that element associated with the first element of the match core, to thereby generate a reduced distance matrix; selecting, from among candidate pairs of stars centered on neighbor nodes of the central nodes of the star pair in the first element of the match core, that candidate star pair which both (a) is consistent with the match core, and (b) among all such candidate star pairs which are consistent with the match core, is associated with a highest distance matrix element in the reduced distance matrix, to thereby generate a second element for the match core; adding the second element to the match core as a further element; deleting from the reduced distance matrix that one of the elements of the distance matrix associated with the candidate star pair added as a second element to the match core, to form a further reduced distance matrix; and repeating the steps of selecting that further star pair, adding, and deleting from the reduced distance matrix, at least until no more candidate star pairs consistent with the match core remain. As mentioned above, a predetermined number of elements in the match core may be deemed to be sufficient to halt the further generation of match cores, which is termed and additional elements than this number are termed "inconsistent".

If the number of elements in the match core is less than a particular number, and no star pair consistent with the match core remains, the search strategy may "back up" and try another search path, by deleting the most recently added element from the match core, whereby the penultimate element, or another element, becomes the last element added to the match core. Another candidate pair of stars is then selected, from among candidate pairs of stars centered on neighbor nodes of the center nodes of any star which is associated with an element of the match core. That pair of stars is selected which both (a) is consistent with the match core, and (b) among all the candidate star pairs which are consistent with the match core, is associated with a highest distance matrix element in the reduced distance matrix. This generates a next candidate element for the match core, which is then added to the match core. That one of the elements of the distance matrix associated with the candidate star pair is deleted, to form a yet further reduced distance matrix. The steps of selecting that further star pair, adding, and deleting from the reduced distance matrix are repeated, at least until no more candidate star pairs consistent with the match core remain.

DESCRIPTION OF THE DRAWING

FIGS. 6a and 6b together are a simplified flow chart which represents a distance matrix generation portion of a method for matching a particular fingerprint with another in accordance with the invention;

FIGS. 8a and 8b1 and 8b2 together constitute a simplified flow chart illustrating details of a candidate node selection step of FIG. 7.

DESCRIPTION OF THE INVENTION

Figure 2:
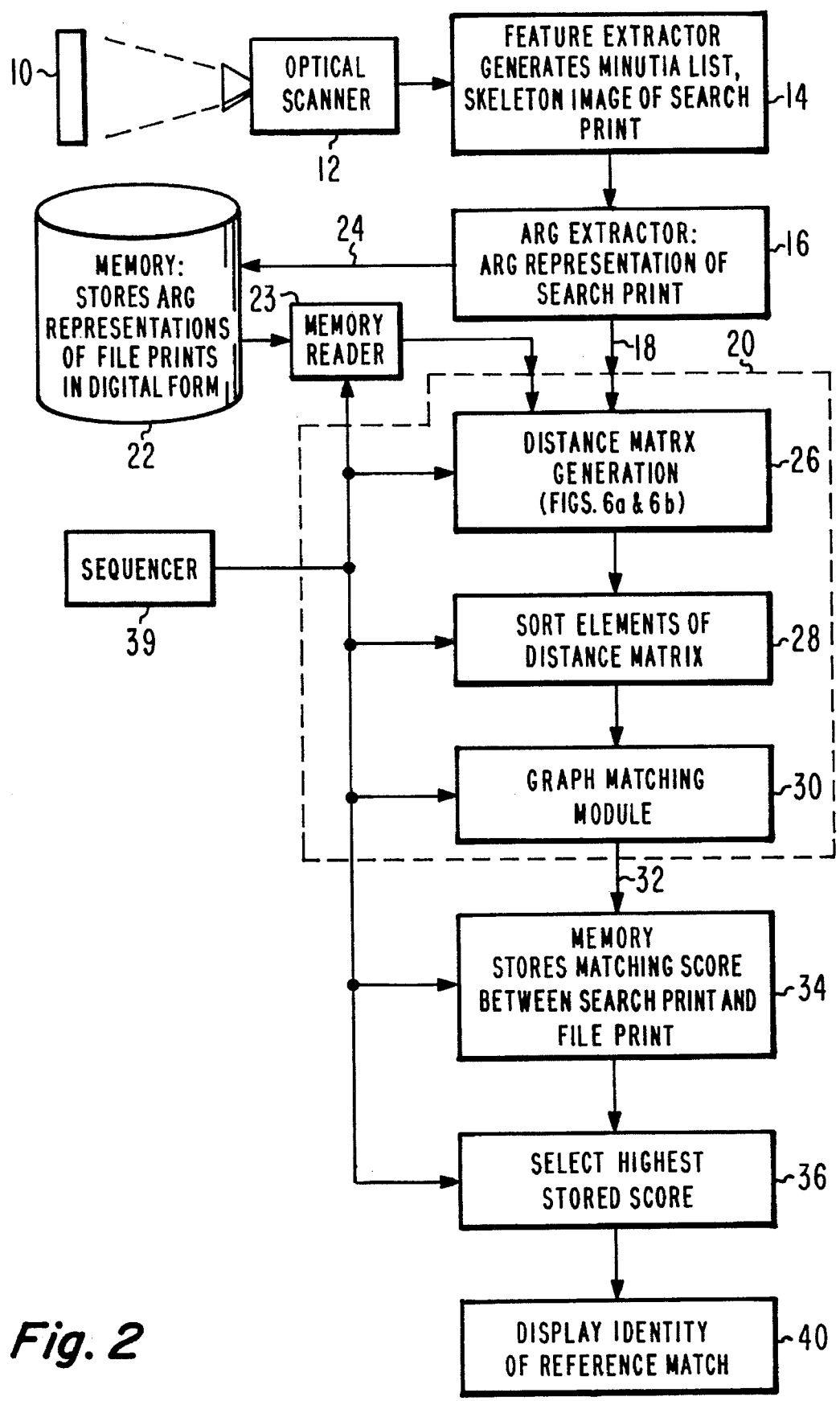
FIG. 2 is an overall diagram of a fingerprint matching apparatus or system according to the invention, illustrating the image scanning, feature extraction, storage of reference information in memory, and an overview of the matching process performed in a computing apparatus, either general-purpose programmed, or special-purpose.

In FIG. 2, a fingerprint card 10, made by inking and rolling the fingers of an individual, is scanned by an optical scanner 12, to generate digital signals representing the image at a sufficient level of detail to allow minutia to be identified. As mentioned above, an alternative to the use of the illustrated scanner is to use a live scanning device which generates digital signals directly from scanning of a finger placed on a plate. As used herein, unless the context indicates otherwise, the term "fingerprint" or "fingerprint image" is used to denote a digital image obtained from the automatic or manual scanning of an inked rolling of a finger, or the capturing of a fingerprint through live scanning devices. The digital signals are applied to a conventional feature extractor 14, which extracts at least a list of minutia locations and directions, and which may produce a skeleton of the image. It may be desirable to extract other information, such as minutia type and local ridge width. A skeleton is an image of an impression of a fingerprint in which the contrast has been increased so that only binary information (ones and zeroes) remain; the skeletonizing may be performed optically, followed by scanning and digitization, or the scanning of the image may result in digital information which represents a gray scale, following which the digital information may be processed to compress the gray scale to two values. The skeleton may be used within the feature extractor to extract another desirable attribute, namely ridge count, as described below. Feature extractor 14 couples the minutia list of the search print to a processor 16. Processor 16 performs conversion of the digital minutia list to an attributed relation graph (ARG), described below in relation to FIG. 3a. In general, the ARG is a symbolic representation of the fingerprint impression, including relevant information, such as minutia location on the card, minutia direction, and other attributes which may be available. The minutia locations on the image will vary each time an inked impression is made or a live scan is taken, even of the same finger, because of variations in the setting of the finger on the card window, and even if the location were by chance the same, the rolling of the finger, and the variations in pressure thereon, would move the locations of some of the minutia relative to other minutia. The ARG of the unknown or search fingerprint is coupled by a path 18 to a processor 20. In the present context, processors 16 and 20 may be the same general-purpose processor, using ARG generation software part of the time, and search software during other times, or they may be distinct hardware devices, each programmed for a specific function.

A memory 22, which may be an electronic memory such as a tape archive, optical disk memory, or the like, is preloaded with attributed relational graph representations of sets of reference fingerprint information, made as described above in relation to the unidentified fingerprint ARG. Since the memory must be loaded in some fashion, a further data path 24, illustrated by dash lines, represents the loading, before the time at which the search is to be made, of memory 22 with ARG representations of the reference fingerprint information from processor 16. A reading arrangement, designated 23, reads information relating to reference fingerprints under command of a control signal coupled thereto.

The minutia which are used in matching according to the invention are generally of two basic types, namely (a) joining points of ridges (bifurcations), and (b) the ends of ridges without branching or joining (ridge endings), but are not limited to these two types. The minimum information which must be available in relation to each minutia is the location, which is generally provided in X-Y Cartesian coordinates, but which might be provided in circular or other coordinates, and the direction. The direction of a minutia is defined in the abovementioned Lee and Guenssten text, but in general, may be said to be the direction of the ridge in a ridge ending situation, and a direction opposite to the direction of the common portion of a furcation in the bifurcation context.

When the memory 22 of FIG. 2 is loaded with reference fingerprint attributed relational graph information, and processor 16 has generated the ARG of an unknown fingerprint, both are made available to processor 20 to allow a search to be made. The identification is accomplished by comparing the fingerprint to be identified sequentially with each relevant fingerprint in the reference fingerprint memory. Thus, two fingerprints, constituting a set, are always being compared; one unknown or search fingerprint, and one of the fingerprints from the reference memory. In general, the comparison of each fingerprint pair is started by generating a distance matrix by calculations on both the unknown fingerprint ARG and on the ARG of one of the reference fingerprints. In FIG. 2, the distance matrix calculations are performed in a module 26 of processor 20. Processor 20 may be a programmed general-purpose computer, in which case it itself produces the control signals which control the memory reader 23 for reading from memory 22, and which controls the various modules 26, 28, and 30 therein; if processor 20 is a special-purpose processor, it may require a time controller or sequencer 39 for synchronizing the activities of the various portions. The distance matrix calculation is performed by comparing stars of one fingerprint ARG with stars of another fingerprint ARG, or more particularly between stars of the unknown fingerprint and the stars of the current one of the reference fingerprints. A star is defined below. The distance matrix calculation performed in module 26 of FIG. 2 results in a matrix with an element for each pair of stars of the attributed relational graphs of the unknown fingerprint and the reference fingerprint. In a preferred embodiment of the invention, the distance matrix is coupled from module 26 to a block 28, which represents a sorting of the elements of the distance matrix in accordance with their magnitude or value. The sorting can be performed in any manner. Block 30 of processor 20 represents a graph matching module, which attempts all possible combinations of matches of the star pairs, in order to build up, star pair by star pair, the largest consistent set of matching star pairs. In order to reduce the amount of processing which is unlikely to produce a substantial match, the processing is preferably performed in graph matching module 30 in an order established by the sorting performed in sorting module 28, starting with the star pairs which are most alike. Once the graph matching is performed in module 30, the result of the matching is transferred, in the form of a value, by way of a path 32 to a temporary store or memory 34, in which the value of at least that graph which contained the largest number of matched star pairs is stored, together with the identity of the reference fingerprint associated with that matching. When the unknown fingerprint has been compared with a reference fingerprint, and its match value recorded, information relating to the next reference fingerprint is read from memory 22 to distance matrix generator 26, and the matching procedure starts again. This sequence continues, at least until a match is found as established by some threshold criterion, or until the supply of relevant reference fingerprints is exhausted. The information stored in store 34 represents the best match, or if more than one match is stored, the values or comparative qualities of the matches, together with the identification of the reference fingerprints with which the match is associated. Block 36 represents the selection of the best match from among those stored, and block 40 represents a display, on which the identification of at least that reference fingerprint set which was the best match to the unknown fingerprint is presented.

Figures 3A, 3B, 3C:
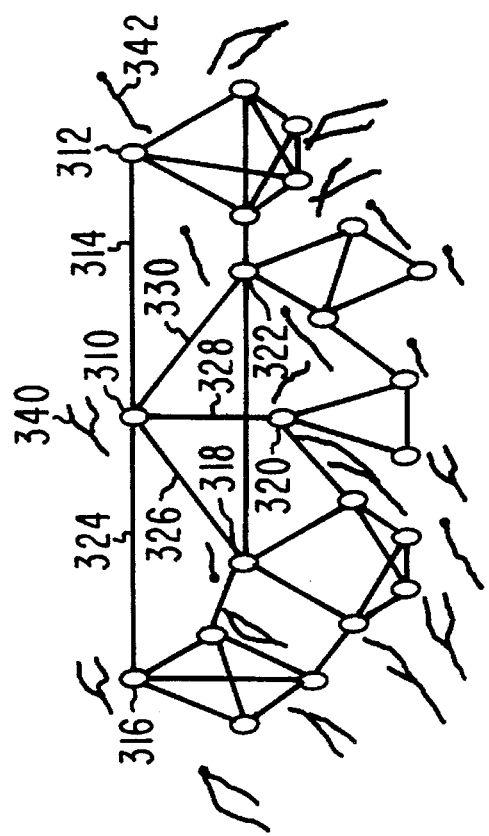
FIG. 3a is an attributed relational graph (ARG) representation of the minutia of a fingerprint.
FIG. 3b is a representation of a possible bit structure of a node attribute vector.
FIG. 3c is a possible representation of the bit structure of a branch attribute vector.

FIG. 3a represents a simplified attributed relational graph of a fingerprint. In FIG. 3a, circles or ovals represent nodes, each of which is associated with one minutia of the extracted fingerprint information. One such node is designated 310, and an adjacent node is designated 312. Each node, as described below, is the central node of a star. A line or "branch" 314 extends between nodes 310 and 312, and is attributed with or "represents" the topological relationship of the two nodes. Each node of FIG. 3a has a plurality of branches extending therefrom, but the minimum number of branches associated with a single node is one. A "star" consists of a selected center node, together with the branches which terminate thereon, and the "neighbor" nodes at the other ends of those branches. Thus, if node 310 is selected as the central node of the star, then the entire star consists of central node 310, branches 314, 324, 326, 328, and 330, together with nodes 312, 316, 318, 320, and 322. The term "neighbors" is assigned to nodes 312, 316, 318, 320, and 322, as they relate to central node 310. In FIG. 3a, each node is associated with a graphic representation of the minutia type. For example, node 310 is associated with a graphic designated 340, which is in the form of a bifurcation, whereas node 312 is associated with a graphic 342, which represents a ridge ending. The orientations of the graphics also indicates the minutia direction. The minutia type and minutia direction information represented by the graphics in FIG. 3a is encoded in the digital words associated with the node.

FIG. 3b represents the format of a digital word which defines a node of FIG. 3a. In FIG. 3b, eighteen bits of the word are associated with the X, Y location of the minutia represented by the node, the next set of eight bits represents the direction of the minutia, a further eight bits define the ridge width local to the minutia (if available), and one or two further bits are assigned to indicate the minutia type (if available). While only one bit is actually needed to specify the two above-defined minutia types, an extra bit is available to encode information relating to additional information should such detail be available.

FIG. 3c represents the bit assignments for the branch attributes or definitions. In FIG. 3c, eight bits identify each of the two nodes (NODE IDs) upon which the branch ends, for a total of sixteen bits. Four additional bits define the ridge count between the two minutia represented by the nodes. Eight additional bits are used for "fuzzy quadrant assignment"; four bits define the location of a first one of the end nodes in a quadrant which is based upon the direction of the minutia of the second node, and an additional four bits define the location of the second one of the end nodes in a quadrant which is based upon the direction of the minutia of the first node. The reason that four bits are required to identify a quadrant is that the quadrants are "fuzzy", in that the basic quadrant is specified, and the location in the basic quadrant, subdivided into three regions, is also specified; there are, as a consequence, twelve possible fuzzy quadrant assignments. Ridge assignment requires two bits in the word of FIG. 3a. The ridge assignment establishes, for two adjacent nodes (associated with the same branch) representing adjacent minutia, whether or not they lie on the same ridge, or are on different ridges; the same-ridge attribute is described below in relation to FIG. 4b. As FIG. 3c has been so far described, the branch vector bits are those which are expected to be stored as part of the ARG in memory 22 of FIG. 2.

Two further sets of bits are calculated in distance matrix module 26 of FIG. 2, but are not necessarily stored in memory 22. These are the Euclidean distance between the two minutia represented by the adjacent nodes, and the normalized ridge width distance between those same minutia. The Euclidean distance is a block of 32 bits in the bit assignment of the word of FIG. 3c, while the normalized ridge width is a block of 32 bits. Normalized ridge width distance is the Euclidean distance divided by half the sum of the two local ridge widths of the adjacent nodes. The ridges in fingers are not necessarily equally spaced; the normalized ridge width distance corrects for the different ridge widths in the finger itself, andor in the inked impression, due to the elasticity of the finger.

Figure 4A:
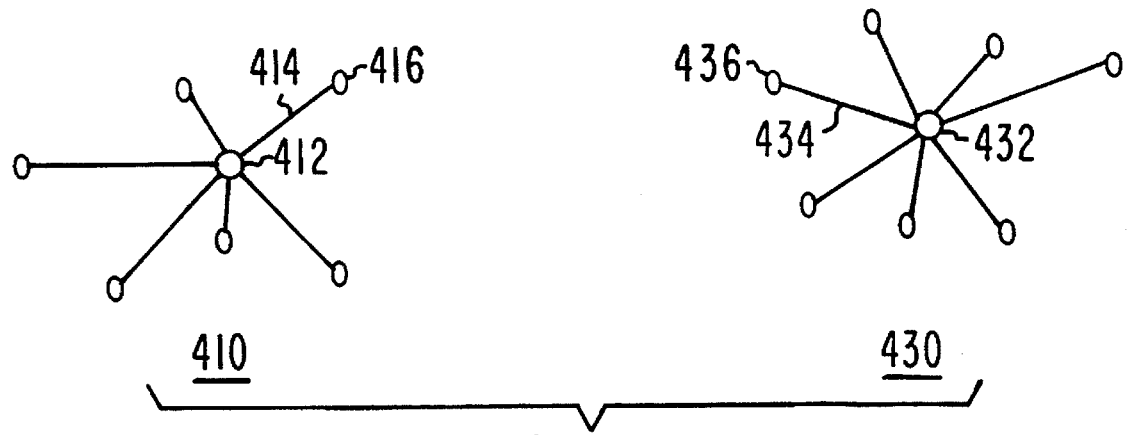
FIG. 4a illustrates a pair of stars from a attributed relational graphs of two fingerprints being compared, each star being made up of a central node, branches from the central node, and neighbor nodes.

FIG. 4a represents a star 410 from the attributed relational graph of the unknown fingerprint, and another star 430 from the ARG of the reference fingerprint with which it is currently being compared. Star 410 may be considered to be a star among those of the ARG of an unknown fingerprint currently being coupled to distance matrix calculation module 26 of FIG. 2 from ARG extractor 16, while star 430 may be considered to be a star among those of the ARG of a reference fingerprint currently being coupled to distance matrix calculation module 26 from memory 22 for comparison. The central node of star 410 of FIG. 4a is designated 412, and the central node of star 430 is designated 432. For the first star of the particular set of fingerprints being compared, it is assumed that the node direction can be in any orientation, that is, a 360° rotation. As a practical matter, fingers are oriented in roughly the same direction on the card when the inked finger is rolled, and even latent fingerprints have a preferred orientation, so that it is possible to restrict the range of angular positions which must be searched. More particularly, it is believed to be sufficient to restrict the matching of minutia directions to within 120°, corresponding to a 60° clockwise and counterclockwise rotation of the image. If the restriction of matching is changed to 361°, the test is essentially eliminated from the processing, which results in processing for all possible rotations, thereby preserving rotational invariance in the matching process, which allows matching to occur notwithstanding any amount of relative rotation of the impressions.

Figure 6A:
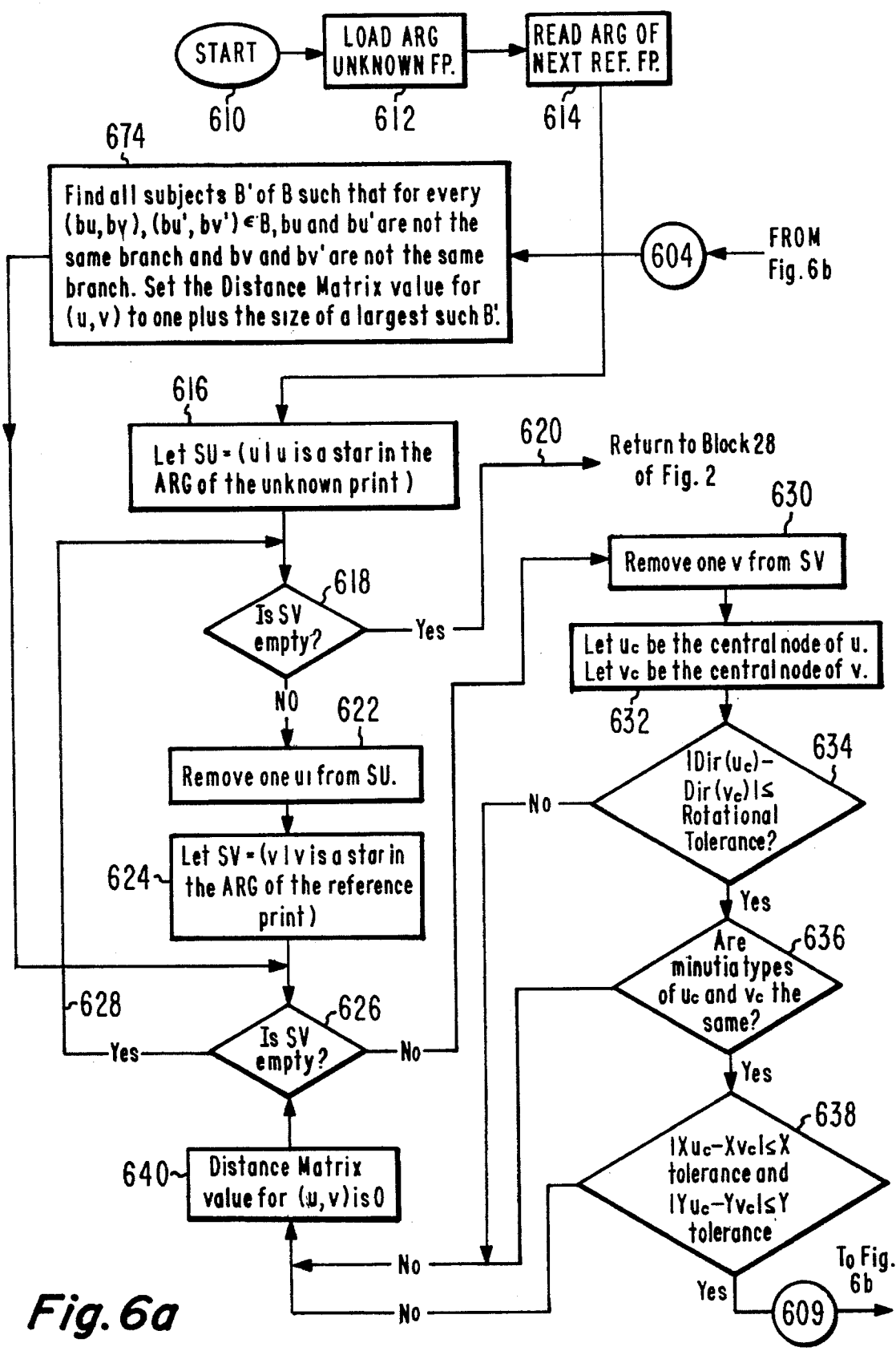

The first step in generating the distance matrix in processor 26 of FIG. 2 for this particular pair of stars of this set of fingerprints (one unknown fingerprint and one reference fingerprint) is to start the processing, as suggested by START block 610 of the flow chart of FIG. 6, load the ARG of the unknown fingerprint into local memory (block 612), and load the ARG of the first of the reference fingerprints (block 614). From block 614, the logic of FIG. 6 flows to a block 616, which represents setting of the set of all stars in the ARG of the unknown fingerprint equal to SU. The logic of FIGS. 6a and 6b ultimately iterates over all elements of SU for this fingerprint. From block 616, the logic flows to a decision block 618, which examines the set SU to determine if it contains elements or if it is empty. If the set SU is empty, the distance matrix calculations are finished for this fingerprint pair, and the logic leaves the flow chart of FIGS. 6a and 6b by a path 620, and flows to sorting module 28 of FIG. 2. If the distance matrix calculations have not been completed, however, the logic leaves decision block 618 by the NO path, and reaches a block 622. Block 622 represents removal of a star u from set SU, so that it may be compared with all stars of the reference fingerprint. Block 624 assigns to another set SV all stars of the ARG of the reference fingerprint, much as block 616 did for the stars of the unknown fingerprint. From block 624, the logic flows to a decision block 626, which examines set SV. If set SV is empty, the current u has been compared with all stars of the reference fingerprint, and the logic flows by a logic path 628 back to decision block 618. Assuming that SV is not empty, the logic leaves decision block 626 by the NO path, and flows to a block 630, which represents removal of one of the stars v from set SV for comparison with u. The remainder of the flow chart of FIGS. 6a and 6b represents the comparison of star u with star v.

Block 632 represents the identification of the central nodes of u and v as $u_c$ and $v_c$. The logic flows in sequence through decision blocks 634, 636, and 638, which compare three of the possible attributed factors (factors which are appended to the node descriptive word) of the central nodes. The first of these factors is similarity of node direction (block 634), the second is similarity of minutia type (block 636), and the third is similarity of the position of the minutia relative to the fingerprint in the image (638). The determination of the first of the factors, namely the factor of node direction, in evaluating the distance matrix element value for this star pair is to compare, with a threshold value, the absolute value of the difference between the directions of the nodes. This is performed in block 634, according to $$|(\text{dir } 312)-(\text{dir } 332)| \leq T_\theta \qquad (1)$$

where the threshold $T_\theta$ may be the abovementioned 120°. This admits of a yes-no result. As mentioned above, the threshold may be set to 361° to preserve rotational invariance.

The determination of the second of the factors in evaluating the distance matrix element value for this star pair, namely the factor of similarity of minutia type, is to evaluate the equality of the minutia types. Is minutia type 412 equal to type 432? This comparison is performed in decision block 636 of FIG. 6, and admits of a yes-no result. If the minutia type information is not available, the result of this step is always YES, so the logic always flows to the next logic block.

The determination of the third of the factors in evaluating the distance matrix element value for this central node of this star pair, namely the similarity of the position of the minutia relative to the fingerprint in the image, is to evaluate the normalized positions of nodes 412 and 432 of FIG. 4a. In order to perform a position normalization, the position of the fingerprint in the image plane is registered. More particularly, this registration may be accomplished by establishing the minimum values of X and Y at which minutia locations occur in the image, and subtracting that minimum value of X and Y from the location of each node being evaluated. This effectively places the fingerprints at the same location in the image. Once the positions of nodes 412 and 432 of FIG. 4a are normalized, the absolute value of the difference between the normalized locations of the nodes is compared with a threshold value in a block 638 of FIG. 6. In a particular embodiment with 512 pixels on an image side, a threshold value of about 150 pixels in both X and Y has been found to provide good results.

$$|(X_{312})-(X_{332})| \leq T_X \qquad (2a)$$

$$|(Y_{312})-(Y_{332})| \leq T_Y \qquad (2b)$$

If $T_X$ is set larger than the width of the image, and $T_Y$ is set larger than the height of the image, translational invariance is preserved, and the response of block 638 is always YES. The determination of the first three of the factors in evaluating the distance matrix element value for this star pair is completed by assigning values to the results of the above three determinations; a value of zero is assigned as the value of the element of the distance matrix for this star pair of this fingerprint pair if any of the three conditions is not met, whereas, if all the conditions are met, no value is assigned, and further evaluation is performed to establish a value. This failure to meet all the conditions established by decision blocks 634, 636, and 638 results in the logic reaching block 640. Block 640 leads back to decision block 626, and causes the logic to select another v for evaluation, if all v have not been evaluated.

Referring to FIG. 4a, and assuming that all of the above-mentioned three conditions are met, the comparison of stars centered at nodes 412 and 432 continues, and the logic flows from the YES output of decision block 638 to a node 602, which leads to the logic of FIG. 6b. The logic of FIG. 6b continues the comparison of stars centered at nodes 412 and 432 continues by comparing a combination vector including (a) the branch attribute vector, and (b) the attribute vector of the node at the end of the branch, of each of the branches emanating from node 412, in sequence, with each of the branch attribute vectors (and the associated node attribute vectors) emanating from node 432. All branches associated with current central node $u_c$ are incorporated into a set BRU in a block 642. A decision block 644 evaluates set BRU, and, if the set is empty, sends the logic by way of a node 604 back to the logic of FIG. 6a. Assuming that the set BRU is not empty, the logic leaves decision block 644 by the NO path, and arrives at a block 646. Block 646 represents the selection of one branch bu from set BRU for further processing, and its removal from set BRU. Also in block 646, the node at the other end of the selected branch bu from the central node $u_C$ is designated as the "neighbor" node $u_N$. Block 648 represents assignment of all the branches of the reference fingerprint star to set BRV. Decision block 650 examines set BRV, and returns the logic to block 644 if the set is empty; this represents the fact that all branches in set BRV have been compared with the current branch bu of set BRU. If the set BRV is not empty, the logic leaves block 650 by the NO path, and reaches a block 652. Block 652 represents the selection of a branch bv of the star v of the reference fingerprint for comparison with bu, and removal of branch bv from set BRV. Block 652 also represents designation of the node at the other end of the selected branch bu from the central node $v_C$ as the "neighbor" node $v_N$.

The remainder of the logic of FIG. 6b represents the comparison of current branch bv of the reference star with the current branch bu of the unknown star, and comparison of current neighbor node $v_N$ of the reference star with current neighbor node $u_N$ of the unknown star. The comparison of the branches and neighbor nodes may be understood, for example, in FIG. 4a, in which a comparison is first made between (a) the combined vectors representing branch 414 and neighbor node 416 and (b) the combined vectors representing branch 434 and neighbor node 436. The comparison may be made of the five branch attributes, which are (1) the ridge count attribute, (2) the fuzzy quadrant attribute, (3) the ridge assignment attribute, (4) the Euclidean distance attribute, and (5) the normalized ridge width distance attribute, which are all of the pieces of information found in the word of FIG. 3c. A comparison may be made using two of the neighbor node attributes, direction and minutia type, which are found in the word of FIG. 3b. These comparisons are discussed in more detail below.

Figure 4B:
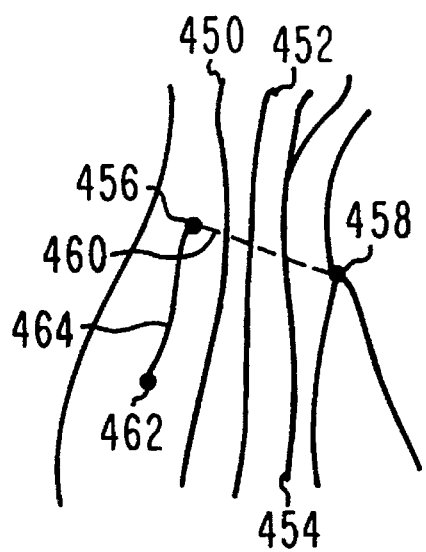
FIG. 4b illustrates a portion of a fingerprint showing minutia at the ends of a ridge and at a bifurcation of a ridge, and also showing the measurement of ridge count between adjacent minutia.

To understand the ridge count attribute, note that FIG. 4b illustrates a simplified portion of a skeletonized fingerprint impression. In FIG. 4b, a plurality of ridges 450, 452, 454 separate two minutia 456 and 458. A conceptual line, dash line 460, extending between minutia 456 and 458, crosses the three ridges, so the ridge count in this particular case is three. The ridge counts of the two branches bu and bv (one from each star) must be equal, or be within a tolerance threshold. The ridge count attributes of the two branches bu and bv are compared in decision block 654 of FIG. 6b.

Figure 5B:
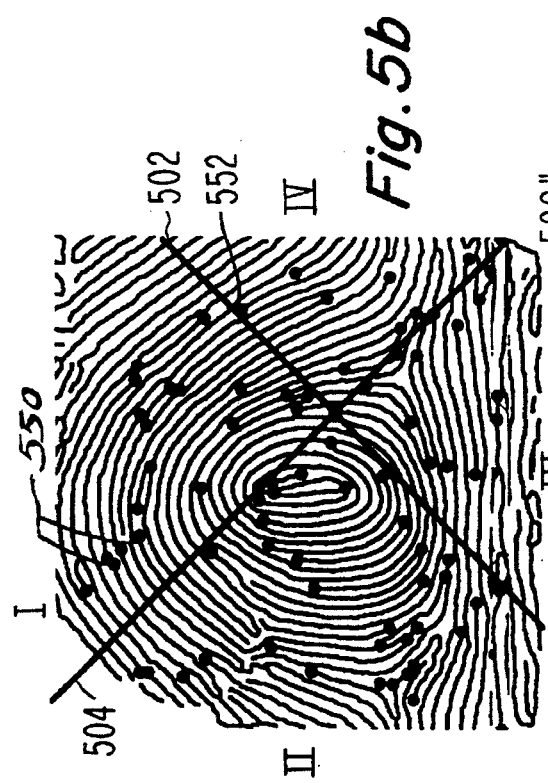
FIGS. 5a, 5b, 5c, and 5d represent the local coordinate system about a particular minutia, the coordinate system definition applied to one minutia from among the minutia of a particular fingerprint, fuzzy quadrant definition similar to that of FIG. 5b with the coordinate system rotated in the clockwise direction, and fuzzy quadrant definition similar to that of FIG. 5b rotated in the counterclockwise direction.
Figure 5D:
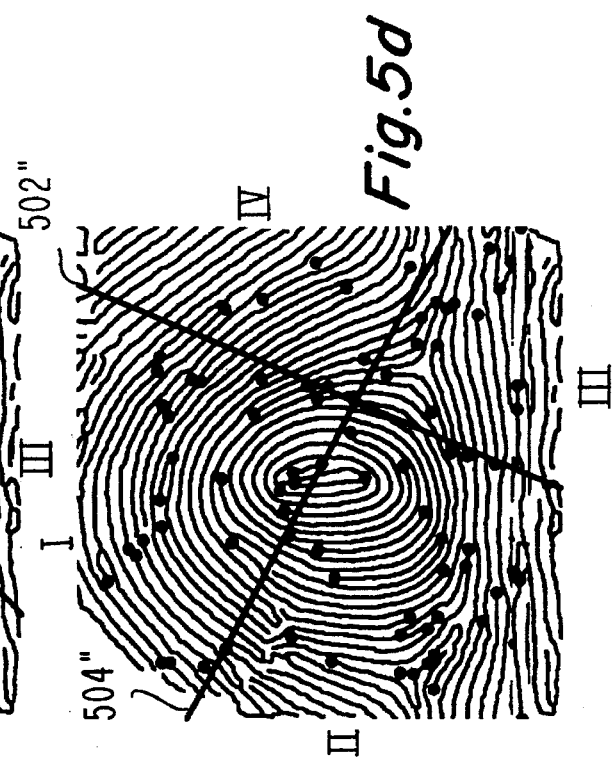
Figure 5A:
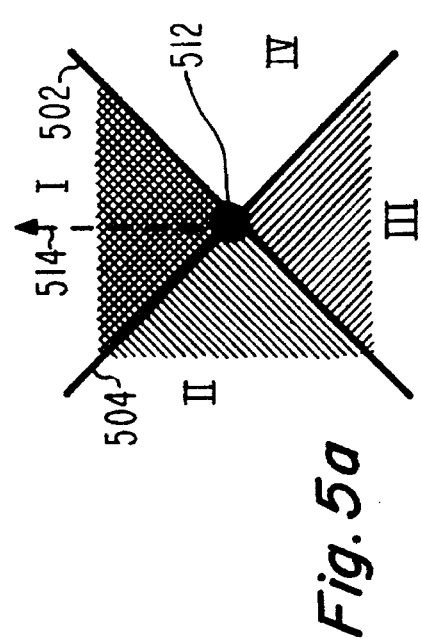

Assuming that the ridge counts for these two branches satisfy the equal or within-tolerance criteria, the logic of FIG. 6b flows from block 654 by its YES output to a further block 656, in which the fuzzy quadrant is evaluated. Evaluation of the fuzzy quadrant requires an understanding of the local coordinate system. FIGS. 5a, 5b, 5c, and 5d aid in understanding local coordinates. In FIG. 5a, a central minutia 512 has a minutia direction indicated by an arrow 514. Arrow 514 bisects the first quadrant, quadrant I, and the other quadrants II, III, and IV are located in successive counterclockwise positions about the central node. The direction of arrow 514 is digitally encoded as the minutia direction, and is one of the attributes associated with the node which corresponds with the minutia in the ARG. In FIG. 5b, axes 502 and 504 intersect at a location which is coincident with a minutia (dark dots) of a skeletonized fingerprint impression, and the direction of the minutia bisects the first (I) quadrant defined by lines 502 and 504. As to the minutia at 0,0 of the coordinate system of FIG. 5b, the nearest minutia (if they exist) in the first, second, third and fourth quadrants are defined as neighbors. If desired, additional next-nearest minutia in each quadrant may be included within the definition of neighbors. If only the nearest minutia in each quadrant is defined as a neighbor, there can be no more than four neighbor nodes of a node selected as the center of a star in the attributed relational graph. If the two nearest minutia in each quadrant are defined as neighbors, there can be no more than eight neighbor nodes of central node of each star; for three neighbor minutia in each quadrant, twelve is the maximum number of neighbor nodes.

Even if the direction of a minutia could be established perfectly, the rolling of the fingerprint might result in the same minutia of matched fingerprints falling on opposite sides of an axis, such as axes 502 or 504 of FIG. 5b, in the unknown and the reference fingerprints. However, it is not possible to define the minutia direction without some degree of error, whereupon minutia falling near the quadrant borders may randomly fall on either side in the unknown and reference impressions. In order to render the search more robust in the presence of slight differences which would result in the neighbor minutia falling into different quadrants in the two fingerprints, a "fuzzy" quadrant approach is used. In the "fuzzy" quadrant approach, each neighboring minutia or node is defined as being "strongly" in a particular quadrant or "weakly" in two adjacent quadrants.

Figure 5C:
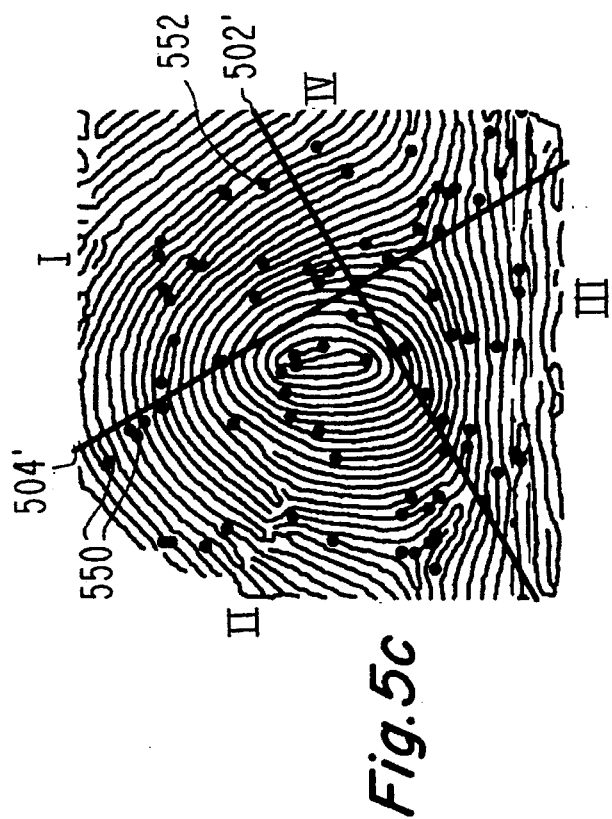

FIG. 5c has the same fingerprint impression as FIG. 5b, but has the axes 502' and 504' rotated by 15° clockwise. As a result, minutia 550, which are in the first quadrant in FIG. 5b, are in the second quadrant in FIG. 5c, while minutia 552, which are in the fourth quadrant in FIG. 5b, are in the first quadrant in FIG. 5c. Other minutia in other quadrants may similarly move to an adjacent quadrant. FIG. 5d is similar to FIG. 5c, but has axes 502" and 504" rotated 15° counterclockwise from the original position. This, of course, results in transfer of some of the minutia to different quadrants from those which they originally occupied.

Figure 1B:
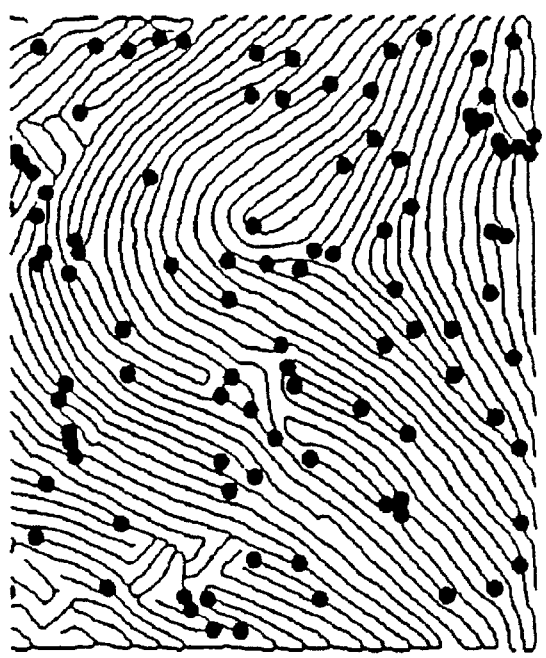
FIGS. 1a and 1b are representations of skeletonized print images of a single finger, illustrating the effects of different inking conditions of the impression on the resulting minutia.
Figure 1A:

The fuzzy quadrant attribute is twelve-valued, four of which values are "strongly" in a basic quadrant, and the other eight of which are "weakly" in two mutually adjacent quadrants. The evaluation of the fuzzy quadrant value is accomplished by noting, for each neighbor minutia of a central node, if it remains in a quadrant regardless of the abovementioned clockwise and counterclockwise shifts of the axes; if it so remains, it is said to be strongly in that quadrant. A numeric value may be assigned to this condition. A numeric value which has been found to be satisfactory is zero for the first quadrant, three for the second quadrant, and six and nine for the third and fourth quadrants, respectively. If, during a clockwise shift of the axes, as illustrated in FIG. 5c, a neighbor minutia fall into a different quadrant, it is designated as being weakly in the original quadrant and weakly in the quadrant into which it moves as a result of the axis rotation. More specifically, if a minutia moves from quadrant I to quadrant II, from II to III, from III to IV, or from IV to I, the values of 1, 4, 7, and 10 are assigned, respectively. Similarly, for a counterclockwise shift of the axes, as suggested in FIG. 5d, if a minutia moves from quadrant II to quadrant I, from III to II, from IV to III, or from I to IV, the values of 2, 5, 8, and 11 are assigned, respectively. This value is encoded as four bits, and is part of the information which is stored in memory 22 of FIG. 1, in a portion of the eight-bit "fuzzy quadrant" word portion illustrated in FIG. 3c. There is another equally important quadrant associated with the node pair currently being evaluated, and that is the fuzzy quadrant of the central node in the coordinate system of the neighbor node; this is stored in the remaining four bits of eight-bit fuzzy-quadrant word portion of FIG. 3c.

When evaluating the fuzzy quadrant for a particular star pair, using the available information from the memory, in the case of the reference fingerprint, and from the newly generated ARG, in the case of the unidentified fingerprint, both of the four-bit fuzzy quadrant values are used, namely (a) that one which defines the location of the neighbor in the central node coordinates, and (b) that one which defines the location of the central node in the neighbor coordinate system. As between the two branches currently being evaluated, the fuzzy quadrant of the neighbor node of one star must be within one numerical value of that of the second star; this guarantees that the relative locations of the two neighbors are similar in the two stars. To accommodate the need to make the numeric value of 11 "within one" of the numerical value 0, the determination is made modulo 12. Similarly, the fuzzy quadrants of the central nodes with respect to the neighbor nodes are evaluated modulo 12. The evaluation of the fuzzy quadrant is performed in decision block 656 of the logic flow of FIG. 6b.

The next step in evaluating the branch attributes of branches bu and bv is performed in a decision block 658 of FIG. 6b, in which the value of the comparison of the ridge assignment or the "same ridge" attribute is made. Referring to FIG. 4b, minutia 456 and 462 lie on the same ridge 464, but minutia 456 and 458 do not lie on the same ridge.

Assuming that the two branches do correspond according to the three preceding evaluations, the logic of FIG. 6b leaves decision block 658 by the YES path, and reaches decision blocks 660 and 662, in which the next attributes to be compared for this pair of branches, namely the Euclidean distance attribute and the normalized ridge width distance attribute, are evaluated. These may be expressed as $$1/\alpha\ Ed_{314} \leq Ed_{334} \leq \alpha Ed_{314} \quad (3)$$

$$1/\beta\ NRWD_{314} \leq NRWD_{334} \leq \beta NRWD_{314} \quad (4)$$

where $\alpha$ and $\beta$ are numerics, which have been successfully assigned values in the range of 1.2 to 1.3. This numeric represents possible scale factor variations; the equations assume that, in the case of fingerprints which are deemed to be equal, the distances between minutia do not vary by more than 30% as between the two prints. Naturally, other values may be used if appropriate. This also provides tolerance for minutia location variations attributable to inking variations andor minutia extraction variations.

The logic flow in blocks 654 through 662 of FIG. 6b completes the evaluation of the first pair of branches bu and bv, but not of the first pair of associated neighbor nodes $u_N$ and $v_N$. Assuming that the branches themselves are deemed to correspond, the associated nodes are evaluated by comparing their respective directions and minutia types in blocks 664, 666, and 668. The minutia type comparison is made first, in decision block 664. Equality of minutia type is required, if the data is available. Assuming that the minutia types are equal, the directions of the minutia associated with the neighbor nodes are incorporated into the comparison by logic blocks 666 and 668 of FIG. 6b in two different ways.

As with the comparison of the difference of directions of the central nodes, the rotational restriction on the difference of directions of the neighbor nodes may be defined by $$|dir_{316} - dir_{336}| \leq 120° \quad (5)$$

Setting the value of the threshold to 361° essentially eliminates this test, allowing matches to be found with rotational invariance. This comparison is made in block 666 of FIG. 6b.

Another directional limitation is that of the difference of differences of directions, which is consistent with rotational invariance. This test is performed in block 668, and is defined by $$|(dir_{312} - dir_{316}) - (dir_{332} - dir_{336})| \leq 30+ \quad (6)$$

which identifies the orientation of the neighbor node direction relative to the direction of the central node.

If any of the tests performed by decision blocks 654–668 (where the hyphen represents the word "through") fail, the logic flows by way of a logic path 672 back to decision block 650, because the attributes of bu and bv didn't correspond, or the attributes of $u_N$ and $v_N$ didn't match, and another pair of branches and neighbor nodes must be evaluated, if they exist.

Assuming, however, that the branch/neighbor meets all the limitations of the comparison as so far described in the logic flow of FIG. 6b, this may be better understood as being equivalent to matching branch 414 and neighbor node 416 of star 410 of FIG. 4a with branch 434 and neighbor node 436 of star 430. It must be remembered that star 410 is a star from the unknown fingerprint, while star 430 is from the reference fingerprint. The logic flow proceeds from block 668 of FIG. 6b to a block 670, which represents adding of branch pair bu and bv to a set, designated B, of matched branches for the star pair u and v. This completes the evaluation for this branch/neighbor node pair, and the logic flows back to decision block 650 to continue the evaluation. This branch/neighbor comparison process is performed for each pairing of branches of the star pair currently being compared. Thus, each of the branch/neighbor-node vectors in star 410 of FIG. 4a is compared with all of the branch/neighbor-node vectors of star 430. It must be realized that any one, or several, of the branch/neighbor-nodes of star 410, can match with any one, or several, of the corresponding portions of star 430. Eventually, all the branch/neighbor-node matches will have been evaluated, set BRU will be empty, and the logic then leaves decision block 644 by the YES path, and flows by way of a node 604 back to the flow chart of FIG. 6a.

In FIG. 6a, the logic flows from node 604 to a block 674, which represents choosing a maximal or largest consistent subset from B, the set of all branch/neighbor-node matches derived by evaluation of all the branch/neighbor-node pairings of the star pair u,v currently being compared. Consistency requires that no single branch/neighbor-node may appear in more than one pair of branch/neighbor-nodes in the subset. This requirement of consistency avoids the logical problem of assigning two (or more) branches in the reference star to one branch of the unknown star, or vice versa. The value of the element of the distance matrix for this star pair is set in block 674 to $$1+|MCS|=\text{element value} \quad (7)$$

where MCS is a maximal consistent subset of the set of all matched pairings of branch/neighbor-node pairs. Thus, if three unique branch/neighbor-nodes of one of the stars of the star pair matches three unique branch/neighbor-nodes of the other star of the pair, the value of the distance matrix element for that star pair is one plus three, or four. From logic block 674, the logic flows back to decision block 626.

As so far described, one star of the unknown fingerprint has been compared with one star of the reference fingerprint. Distance matrix calculation requires comparison of each star of the ARG of the unknown fingerprint with each star of the ARG of the reference fingerprint. So long as star pairs remain which have not been compared as determined by decision blocks 618 and 626, the logic returns to block 630, to continue the evaluation of the star pairs. The above-described steps are performed for all such pairings of stars, to thereby fill the elements of the distance matrix with values. Eventually, when the unevaluated star pairs have been exhausted, the logic leaves decision block 618 by the YES path, and proceeds by a logic path 620 to module or block 28 of FIG. 2.

The number of elements in the distance matrix depends upon the number of stars which are compared in the fingerprint pair; if the number of stars in the unknown fingerprint is M, and the number of stars in the reference fingerprint is N, the distance matrix contains M×N elements. The number of stars equals the number of minutia in the extracted fingerprint, since the central node of each star is a node in the ARG, and each node is associated with one minutia.

During the determination of the elements of the distance matrix, certain of the tests may be excluded due to lack of information, to preserve certain invariances, or to speed the comparison process. The minutia type, local ridge width, ridge count, andor ridge assignment information may not be available, and may be dispensed with.

Once the elements of the distance matrix have been filled in for one pair of fingerprints, as represented by the logic of FIGS. 6a and 6b, the elements of the distance matrix are coupled to module 28 of processor 20 of FIG. 2, and the logic flow (or sequencer 39) starts the operation of sorting processor 20. Processor 20 sorts the elements of the distance matrix for this pair of fingerprints in accordance with their values. Any standard sorting routine should be satisfactory. The result of the sorting is a distance list in which the element sizes are tabulated. Generation of the list is illustrated as block 710 in the flow chart of FIG. 7.

The distance list generated by sorting module 20 of FIG. 2 is passed to graph matching module 30. Graph matching module 30 takes the star pairs in the sorted distance matrix element list as starting points, "places" corresponding stars in a network or set (termed a "subgraph" below), and attempts to expand the network or set of matching stars toward inclusion of all of the stars of the fingerprint pair. Of course, if the reference and unknown ARGs do not have equal numbers of stars, they cannot all be matched fully and completely. It is to be expected that, due to inking and other variables, all the stars of the ARGs of two same-finger impressions will not necessarily match. Consequently, processor 30 attempts to build the largest subgraphs of consistent star pairs, as described in conjunction with the flow chart of FIG. 7. Other constraints are described below.

Figure 7A:
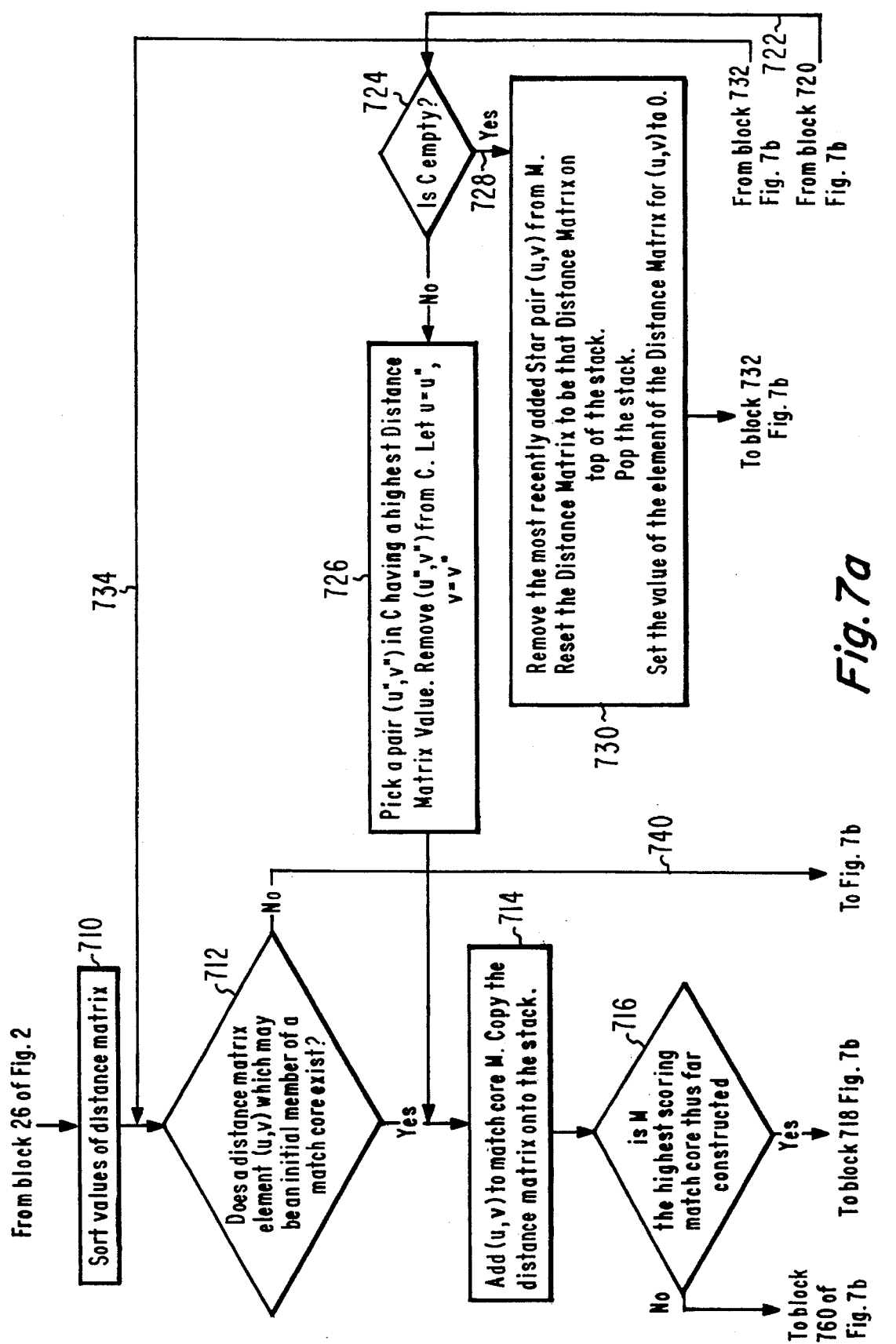
FIG. 7 is a simplified flow chart which represents the match core generation portion of the determination of similarity of two fingerprints in accordance with the invention.
Figure 7B:
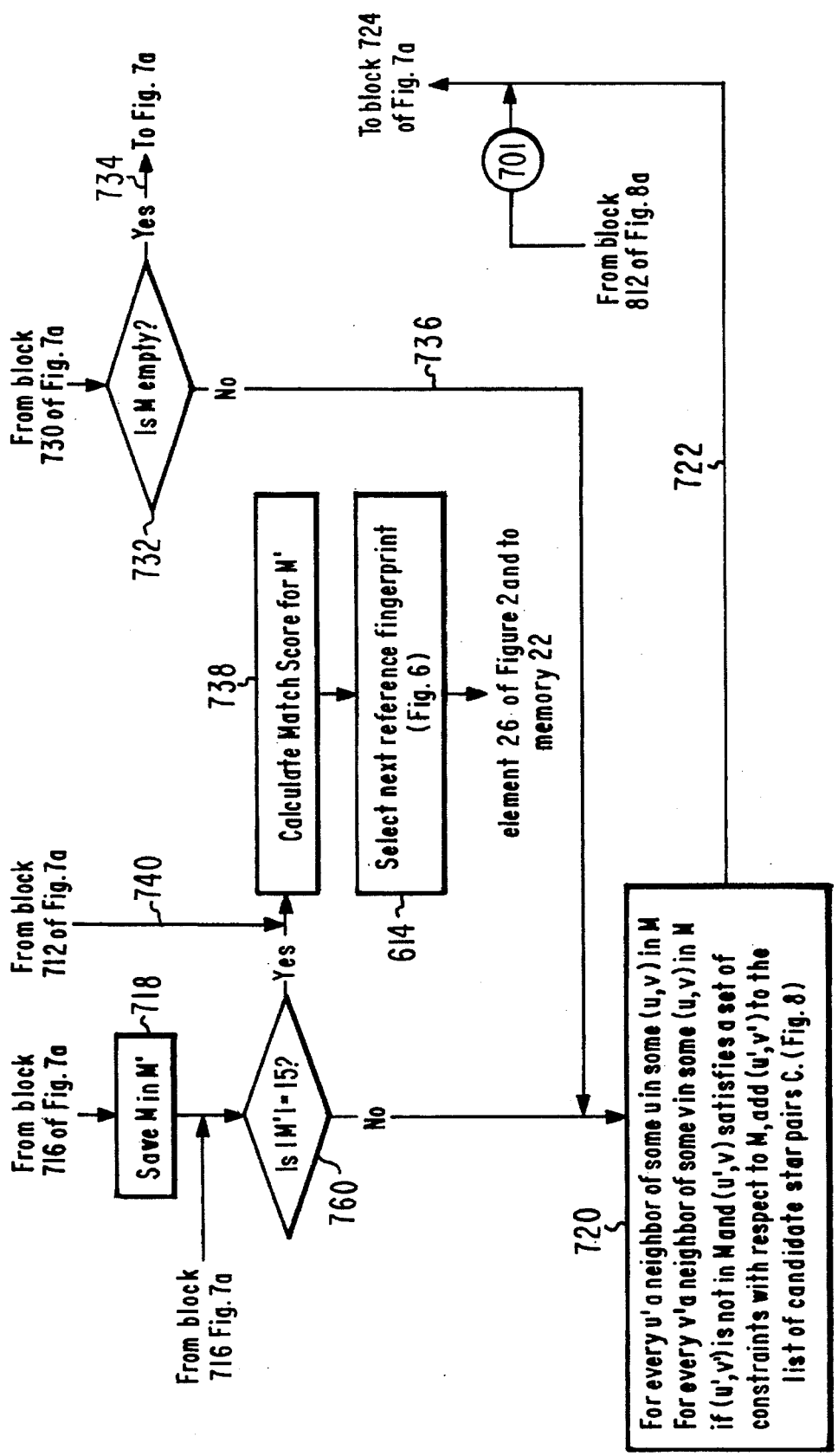

The logic for generation of the subgraph for the matching of the fingerprint pair starts by selecting the star pair (one from the unknown and one from the reference) which meets criteria described below, and which has the highest value, or a highest value, if more than one have the highest value, among the sorted list of elements of the distance matrix, produced at the output of logic block 710 of FIG. 7. The selection of the highest-value star pair $(u_1, v_1)$ is illustrated in FIG. 7 by the combination of a decision block 712, which determines if such an element of the current distance matrix exists, and a further block 714. This selection essentially nominates the most likely matched pair as a starting point for the construction of the subgraphs of linked stars, which in turn tends to avoid processing which is unlikely to achieve good results. As described below, the identities u,v of these first two stars are added in block 714 to a set termed a "match core" also known as "M" which is simply a set describing the subgraphs composed of those star pairs of the pair of fingerprints for which correspondence is being determined. Thus, the match core is simply a definition of the subgraph. The match core M thus initially is the set $\{(u_1, v_1)\}$. The first pair of stars is always added to the match core, although later star pairs are added only if they actually form a consistent correspondence, which is established by meeting a set of constraints with respect to the match core. The addition of the first set of stars is represented by block 714. Also, block 714 represents "pushing" the current value of the distance matrix onto the stack of distance matrices.

As mentioned above, the selection of the initial star pair for inclusion in the match core must meet certain criteria. Its distance matrix value must be above a threshold. In a particular embodiment of the invebntion, the threshold value was five. In addition, the initial star pairs are limited in number to K, which has the effect of limiting the number of times that the flow chart of FIG. 7 is invoked. Several vlaues have been tried, and a value of four has been selected for further use.

The current value or match score S of the match core M, is defined as

S=(number of star pairs in M) * (median value taken over all distance matrix values of all star pairs in M)+(number of branches in the ARG of the unknown fingerprint, between central nodes of stars in any pair of stars in M)+(number of branches in the ARG of the reference fingerprint, between central nodes of stars in any pair of stars in M)

where * is multiplication.

The match core M' represents the one match core which has the highest value of match score thus far encountered. The match score S of the current M is compared with the match score S' of M'. If S is greater than S', M' is replaced with M. This comparison is performed by the combination of a decision block 716 of FIG. 7, and further block 718 performs the substitution. The logic then arrives at a further decision block 760.

A particular fingerprint comparison is deemed to be complete when the number of stars identified to the match core reaches a particular number, because it is assumed that a matching of that number of stars in a subgraph unambiguously identifies a matched pair of fingerprints. Decision block 760 of FIG. 7 compares the size of the current match core M with the selected threshold number of elements. A number which has been used successfully is fifteen. Thus, when fifteen stars pairs have been added to match core M, the match is declared by block 760. Naturally, threshold numbers other than fifteen could be used instead. The logic then flows to a block 720.

Once the first element is added to the match core, a candidate list of neighbor pairings is generated. Block 720 of FIG. 7 represents the generation of a candidate list C. Details of the functioning of block 720 to generate a candidate list are described below in conjunction with FIGS. 8a and 8b. From block 720, the logic flows by a path 722 to a decision block 724, which examines candidate list C to determine if it is empty, or still contains candidates. If the candidate list contains members, the logic leaves decision block 724 by the NO path, and arrives at a block 726. Block 726 of FIG. 7 represents picking a pair of stars (u", v") from C having a highest distance matrix value, and removing it from candidate list C. The logic then flows back to block 714, where the element just selected in block 726, namely the highest-value element (u", v"), is added to the match core. The match core now is the set $\{(u_1, v_1) (u_2, v_2)\}$. So long as there are candidate pairs left, the logic flows around the path including blocks 716, 718, 760, 720, 724, 726, and 714, adding a candidate to the match set at each iteration. The match set is $\{(u_1, v_1) (u_2, v_2) \ldots (u_N, v_N)\}$. Because the candidates for addition to the match core have non-zero distance matrix element values, and because they have passed other constraints in block 720, as described below, the candidate star pair can always be added to the match core. Consequently, the loop including blocks 720, 724, 726, and 714 should continue to operate so long as candidates are available. Eventually, when the supply of candidates is exhausted, the logic leaves block 724 by way of YES path 728, and flows to block 730.

Block 730 of FIG. 7 represents removal of the last-added element $(u_N, v_N)$ of the match core M. This represents a "backing up" or backtracking when a "blind alley" path has been taken, namely when the match core or subgraph of a certain configuration cannot be expanded any further. The configuration of the match core is changed by the backtracking and starting down a new search path, beginning with match core $\{(u_1, v_1) (u_2, v_2) \ldots (u_{N-1}, v_{N-1})\}$. When the match core is empty, therefore, the search starts again with a new star pair as its base, which next star pair is selected as the second-highest in the distance matrix, or another one of the highest-valued pairs, if more than one has the same highest value. Block 730 also represents selecting the distance matrix at the top of the stack as the current distance matrix by removing (popping) it from the stack. In the new distance matrix, the value of the element for the star pair $(u_N, v_N)$ is set to zero.

From block 730, the logic flows to a decision block 732, which evaluates the contents of the match core, to see if the match core is empty. The match core may be empty if only the first element was contained therein, and no further candidates for inclusion were found. If the search performed by blocks 714–726 of FIG. 7 does not find the selected number of matched star pairs in the fingerprint, the core will eventually be empty, because we have backtracked, exploring every combination of neighbor stars of the subgraph based on the match core $\{(u_1, v_1)\}$, subject to constraints detailed below. If the match core M is empty, the logic leaves block 732 by the YES path, and flows by a path 734 back to block 712 to begin another pass through the logic for another star pair. If there is another star pair which could begin another match core as established by decision block 712, block 714 selects another star pair $(u_1', v_1')$ as the initial member of a new match core. If, on the other hand, the match core is not empty, the logic flows from decision block 732 by a path 736 back to block 720. A candidate set is constructed for the reduced match core in block 720, and attempts are made to again expand the match core by traversing the logic path including path 722, blocks 724, 730, and 732.

Eventually, either the number of star pairs in M will be reach the predetermined maximum as discussed in conjunction with block 760, or no star pairs will remain which may serve as the initial members of a match core. In the first instance, decision block 760 will direct the logic to leave the flow chart of FIG. 7 by way of blocks 738 and 614, while in the second instance decision block 712 will direct the logic to leave by path 740 and the same blocks 738 and 614. Logic block 738 recalculates the match score S' for match core M'. This value of S' is what is stored in block 34 of FIG. 2. Block 614 of FIG. 7 represents the selection of the next reference fingerprint, corresponding to the block of the same designation in FIG. 6a.

Figure 8A:
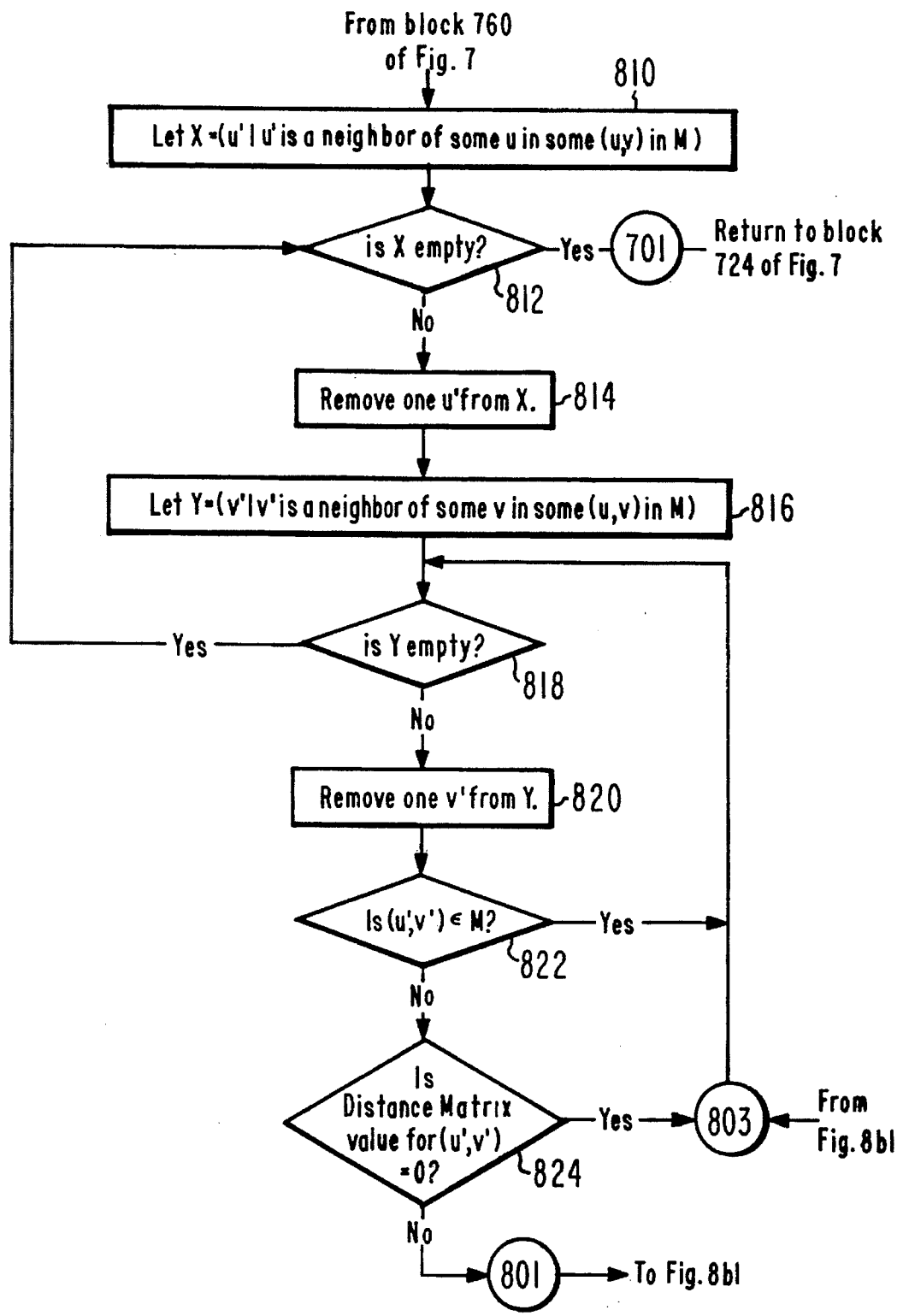

FIGS. 8a and 8b together constitute a flow chart representing the logic flow within logic block 720 of FIG. 7. The logic of block 720, it will be recalled, is for the purpose of determining pairs of stars for inclusion in the list C of candidates for inclusion in the match core. In FIGS. 8a and 8b, the logic arrives at a block 810 from block 760 of FIG. 7. Block 810 represents selection of a set X of all stars centered at neighbor nodes which are part of stars of the ARG of the unknown print in the current subgraph represented by M. The candidate stars must all be neighbors of a node already part of the subgraph, which may include, in the example, as many as fourteen stars. The set X produced by block 810 include all such stars. From logic block 810, the logic flows to a decision block 812, which examines the number of elements in X. If X is empty, the generation of C, the set of candidate star pairs, is completed, and decision block 812 directs the logic to block 724 of FIG. 7 by way of node 701. So long as X is not empty, a star u' can be removed from set X, and the logic leaves decision block 812 by the NO path, and reaches block 814, in which a star u' is removed from set X. From block 814, the logic flows to a block 816, which represents selection of a set Y of all stars centered at neighbor nodes which are part of stars of the ARG of the reference print in the current subgraph represented by M. The candidate stars must all be neighbors of a node already part of the subgraph, which may include, in the example, as many as fourteen stars. The set Y produced by block 816 includes all such stars. From logic block 816, the logic flows to a decision block 818, which examines the number of elements in Y. If Y is empty, the generation of C is not completed, and the logic flows back to block 812. So long as Y is not empty, a star v' can be removed from set Y, and the logic leaves decision block 818 by the NO path, and reaches block 820, in which a star v' is removed from set Y.

Tests are performed in the remainder of the flow chart of FIG. 8a and 8b to determine if the star pair (u',v') may be added to set C of candidate star pairs. More particularly, decision blocks 822 and 824 determine if (u',v') is already in the match core and if the distance matrix value for (u',v') is equal to zero, respectively. If both these conditions fail, the logic flows to FIG. 8b by way of node 801. If either condition is met, then (u',v') may not be added to the set C, and the logic then returns to block 818 to examine another star pair.

From node 801 of FIG. 8b, the logic flows to a block 826, which represents identifying to Z the set of all star pairs (u,v) in match core M such that u' is a neighbor of u and v' is a neighbor of v. Decision block 828 examines Z, and directs the logic flow to block 830 if Z is not empty. Block 830 represents the removal of one (u,v) from Z, for use in the following blocks. Decision block 832 determines if the quadrant value of u with respect to the coordinate system of u' is within one (modulo twelve) of the quadrant value of v with respect to the coordinate system of v'. Decision block 832 also determines if the quadrant value of u' with respect to the coordinate system of u is within one (modulo twelve) of the quadrant value of v' with respect to the coordinate system of v. If both of these conditions are satisfied, the flow goes to decision block 834. Decision block 834 ensures that the ridge count of u to u' is equal to, or within tolerance of, the ridge count of v to v'. If this condition is satisfied, the logic flows to decision block 836. Block 836 determines if the ridge assignments of u and u' and of v and v' are identical. If this condition is met, the logic flows by path 838 back to decision block 828. The loop including blocks 828–836 and path 838 evaluates the potential candidate star pair (u',v') with respect to all star pairs in Z. If any of the conditions established by blocks 832, 834 and 836 fail, the star pair (u',v') is not admitted to the candidate set C, and the logic flows back to block 818 of FIG. 8a by way of node 803.

Once all elements of Z have been evaluated by decision blocks 828–836, the logic leaves decision block 828 by way of path 840 to a block 842, which represents making a set A equal to set M. This allows each star pair in the match core M to be evaluated with respect to the potential candidate star pair (u',v'). From block 842, the logic flows to a decision block 844, which evaluates A. If elements remain in A, the logic flows to a block 846, which represents removal of a star pair (u,v) from A, for use in subsequent decision blocks. Decision blocks 848, 850, and 852 evaluate the star pair (u,v) with the potential candidate star pair (u',v').

Decision block 848 evaluates the difference of differences of directions of the minutia. If the value is within tolerance, flow proceeds to decision block 850. Decision blocks 850 and 852 compare Euclidean distance and normalized ridge width distance, in a manner similar to that described in conjunction with blocks 660 and 662 of FIG. 6b. If any of the conditions fail, the logic flows back to block 818 of FIG. 8a by way of node 803, and star pair (u',v') is not added to the candidate set C. If, on the other hand, the conditions established by decision blocks 848, 850, and 852 are met, the logic flows back to decision block 844. The loop including blocks 844–852 represents iteration over all star pairs in set A. When set A is exhausted, (u',v') has been successfully compared with all star pairs in the match core M. The logic then leaves decision block 844 by the YES path, and arrives at a block 854. Block 854 adds (u',v') to the candidate set C. From block 854, the logic then leaves the flow chart of FIG. 8b by way of node 803, and returns to decision block 818 of FIG. 8a to test another potential candidate star pair.

In summary, this system captures the minutia map and relative topological information of a fingerprint in the form of an attributed relational graph. The information content of the fingerprint map is stored in very compact form, using, less than 2,000 bytes for a minutia map containing 110 to 130 minutia. The search is performed based on inexact matching of the subgraphs of the ARG representations of the fingerprints. The search is efficient, because it uses a heuristically determined "smart" strategy for matching the subgraphs of the ARG representations. The technique weeds through the information available in the minutia maps, identifying a subset of matched minutia, together with their corresponding topological relations. The search strategy is rotation, translation, scale, and deformation invariant, so that it can cope with bad-quality fingerprints burdened with noise, distortion, and various forms of uncertainty such as smears, smudges, and partial and spurious information. A particular advantage of the described system is that no global coordinate system is required, as in some prior-art systems, and detection of global fingerprint characteristics such as cores and deltas is not required. A system according to the invention has been implemented, in preliminary form, in the "C" high-level programming language running on commercial off-the-shelf hardware, such as a standard UNIX workstation. A matching accuracy of 96% has been achieved on all thumbs, all index, and all middle fingerprints in the NIST Special Database 4.

Other embodiments of the invention will be apparent to those skilled in the art. For example, the electronic computing apparatus which performs the comparison between the unknown and reference fingerprints may be at a location distant from the memory in which the reference fingerprints are stored, and the data may be transmitted therebetween by means of digital data paths. The reference fingerprints may be stored in electronic memory in ARG form, or in image form, in which case the conversion to ARG form must be performed on the reference fingerprints before comparison. The steps according to the invention may be performed at times which are well separated from each other, with the data stored in memory during the intervening time. While fingerprints have been described as the personal physical characteristics which may be compared, other such characteristics include palm prints, toe prints, and (bare) foot prints, such as those used by hospitals to identify babies. The described arrangement is for a single fingerprint reader; when a large reference fingerprint file is available, it may be found that greater throughput of unidentified fingerprints is needed, in which case a plurality of processors similar to that described and claimed may be operated simultaneously from the same reference fingerprint file, or from different but related reference fingerprint files; thus, one processor could compare the unknown fingerprint with those reference fingerprints having file numbers ranging from 1 to $N_1$, the second processor could simultaneously compare the same unknown fingerprint with those reference fingerprints having file numbers ranging from $N_2$ to $N_3$, the third processor could simultaneously . . . . The principles of the invention may find use in recognition andor identification of objects/ targets in scenes or images.

What is claimed is:

1. A method for matching a set of unidentified fingerprints, which set includes at least one unidentified fingerprint, with a plurality of sets of reference fingerprints from a fingerprint file, said method comprising the steps of:

generating an attributed relational graph (ARG) including (a) nodes and node attributes and (b) branches between said nodes, and branch attributes, from an extracted digital minutia map of said set of unidentified fingerprints, to thereby implicitly generate stars centered at each of said nodes;

generating a distance matrix between (a) the stars in said ARG of one of said fingerprints of said set of unknown fingerprints and (b) the stars of the ARG of one of the fingerprints in one of said sets of reference fingerprints, said distance matrix including a matrix element associated with each pair of stars;

sorting said elements of said distance matrix for each fingerprint pair, according to the value of said elements, to form a sorted distance matrix which establishes an order of star pair matches;

generating a match core of consistent sets of star pairs from said distance matrix and said ARG in an order established by said sorted distance matrix; wherein said step of generating a match core includes the steps of:

selecting a star pair associated with a highest element of said sorted distance matrix, to define a first element of a match core;

deleting from said distance matrix that element associated with said first element of said match core, to generate a reduced distance matrix;

selecting, from among candidate pairs of stars centered on neighbor nodes of the center nodes of said star pair in said first element of said match core, that candidate star pair which is both (a) consistent with said match core, and (b) among all said candidate star pairs which are consistent with said match core, associated with a highest distance matrix element in said reduced distance matrix, to thereby generate a second element for said match core;

adding said second element to said match core as a further element;

deleting from said reduced distance matrix that one of said elements of said distance matrix associated with said candidate star pair added to said match core, to form a further reduced distance matrix;

repeating said steps of selecting that further star pair, adding, and deleting from said reduced distance matrix, at least until no more candidate star pairs consistent with the match core remain.

2. A method according to claim 1, wherein said step of repeating until no more star pairs consistent with the match core remain includes the step of deeming a particular number of elements in said match core to be inconsistent.

3. A method according to claim 1, further comprising the steps of:

if the number of elements in said match core is less than a particular number, and no star pair consistent with said match core remains, deleting the most recently added element from said match core, whereby another element becomes the last element added to said match core;

selecting, from among candidate pairs of stars centered on neighbor nodes of the center nodes of any star which is associated with an element of said match core, that candidate star pair which is both (a) consistent with said match core, and (b) among all said candidate star pairs which are consistent with said match core, associated with a highest distance matrix element in said reduced distance matrix, to thereby generate a next element for said match core;

adding said next element to said match core; and deleting from said reduced distance matrix that one of said elements of said distance matrix associated with said candidate star pair added as said next element to said match core, to form a yet further reduced distance matrix;

repeating said steps of selecting that further star pair, adding, and deleting from said reduced distance matrix, at least until no more candidate star pairs consistent with the match core remain.

4. A method for matching a set of unidentified fingerprints, which set includes at least one unidentified fingerprint, with a plurality of sets of reference fingerprints from a fingerprint file, said method comprising the steps of:

generating an attributed relational graph (ARG) including (a) nodes and node attributes and (b) branches between said nodes, and branch attributes, from an extracted digital minutia map of said set of unidentified fingerprints, to thereby implicitly generate stars centered at each of said nodes;

generating a distance matrix between (a) the stars in said ARG of one of said fingerprints of said set of unknown fingerprints and (b) the stars of the ARG of one of the fingerprints in one of said sets of reference fingerprints, said distance matrix including a matrix element associated with each pair of stars; and generating a match core of consistent sets of star pairs from said distance matrix and said ARG; wherein said step of generating a match core further comprises the steps of:

sorting said elements of said distance matrix for each fingerprint pair, according to the value of said elements, to establish an order of star pair matches; and in an order established by said sorted distance matrix, performing the further steps of:

(a) selecting a star pair associated with a highest distance matrix element, to define a first element of a match core;

(b) deleting from said distance matrix that element associated with said first element of said match core, to generate a reduced distance matrix;

(c) selecting, from among candidate pairs of stars centered on neighbor nodes of the center nodes of said star pair in said first element of said match core, that candidate star pair which is both (i) consistent with said match core, and (ii) among all said candidate star pairs which are consistent with said match core, associated with a highest distance matrix element in said reduced distance matrix, to thereby generate a second element for said match core;

(d) adding said second element to said match core as a further element;

(e) deleting from said reduced distance matrix that one of said elements of said distance matrix associated with said candidate star pair added to said match core, to form a further reduced distance matrix;

(f) repeating said steps of selecting that further star pair, adding, and deleting from said reduced distance matrix, at least until no more candidate star pairs consistent with the match core remain.

* * * * *